United States Patent [19]

Bailey

[11] 4,316,434
[45] Feb. 23, 1982

[54] METHOD AND APPARATUS FOR IMPROVING HEAT TRANSFER

[75] Inventor: Frank W. Bailey, New York, N.Y.

[73] Assignee: Bailey Burners, Inc., Haskell, N.J.

[21] Appl. No.: 120,978

[22] Filed: Feb. 13, 1980

[51] Int. Cl.³ .............................................. F22B 33/00
[52] U.S. Cl. ............................... 122/20 B; 122/44 A; 122/155 A; 165/1; 165/109 R
[58] Field of Search .......... 122/44 A, 155 A, DIG. 3, 122/20 B, 367; 126/391; 110/147, 322; 165/109, 1; 222/72, 249, 250; 73/197, 243

[56] References Cited

U.S. PATENT DOCUMENTS

| | | | |
|---|---|---|---|
| 642,535 | 1/1900 | Snyder | 165/109 |
| 676,165 | 6/1901 | Wacker | 34/182 |
| 3,143,395 | 8/1964 | Milmore | 165/109 X |

*Primary Examiner*—Edward G. Favors

[57] ABSTRACT

Method and apparatus for improving convective heat transfer by mechanically stirring fluid over the outer surface of a heat exchanger. A stirring mechanism is described which revolves rapidly around a heat exchanger surface in a stream undergoing heat transfer. During rotation, the stirring mechanism is supported near an end of the stirred heat exchanger by a central bearing and drive means. It is also supported over an extended length of the stirred heat exchanger surface by the hydrodynamic action of the stirring mechanism relative to the heat exchange surface without need for an additional central support bearing. The stirring mechanism uniformly turbulates the fluid film over the outer surface of the heat exchanger where heat transfer resistance normally occurs without imposing a pressure drop in the fluid stream undergoing augmented heat transfer. Compact and inexpensive heat exchangers are described which may be used in refrigeration, heating-cooling, and energy conservation systems. They offer special advantages where the temperature differential available for convective heat transfer is low and where it is necessary to recover sensible and latent heat energy from combustion products or dirty gaseous streams. Economizer units are described which may retrofit existing heating systems and recover most of the sensible and latent heat energy which these systems now waste in flue products. Special draft control features of these units also allow the adapted heating systems to operate with nearly identical steady-state and seasonal efficiencies.

16 Claims, 30 Drawing Figures

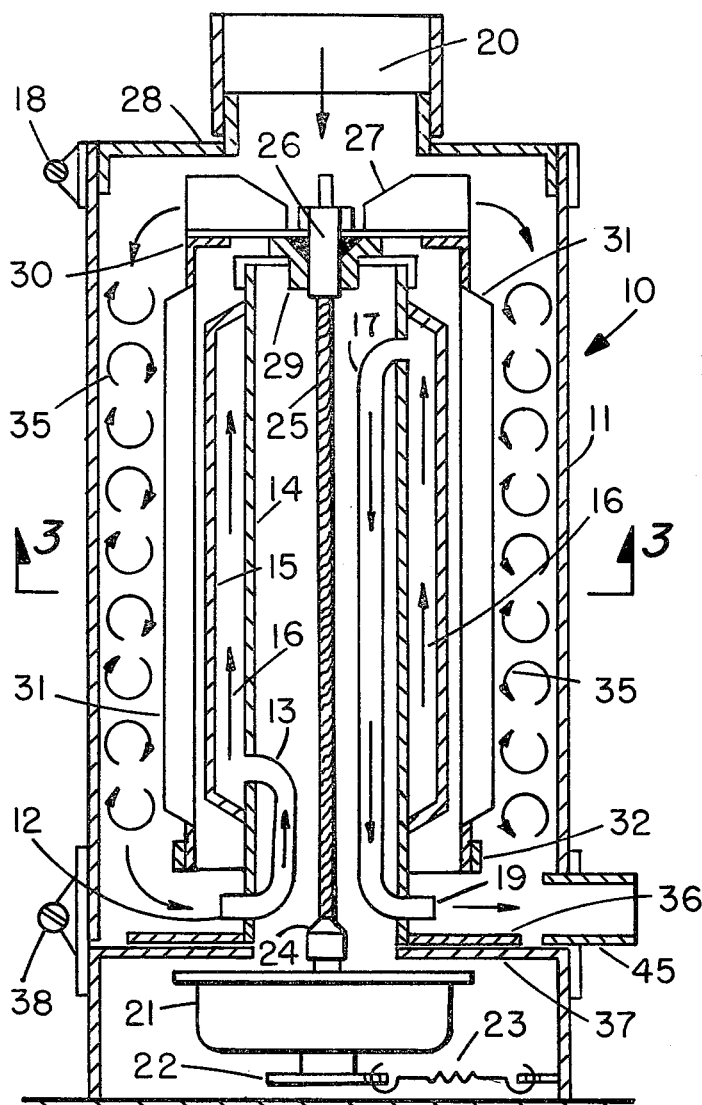
FIG 1
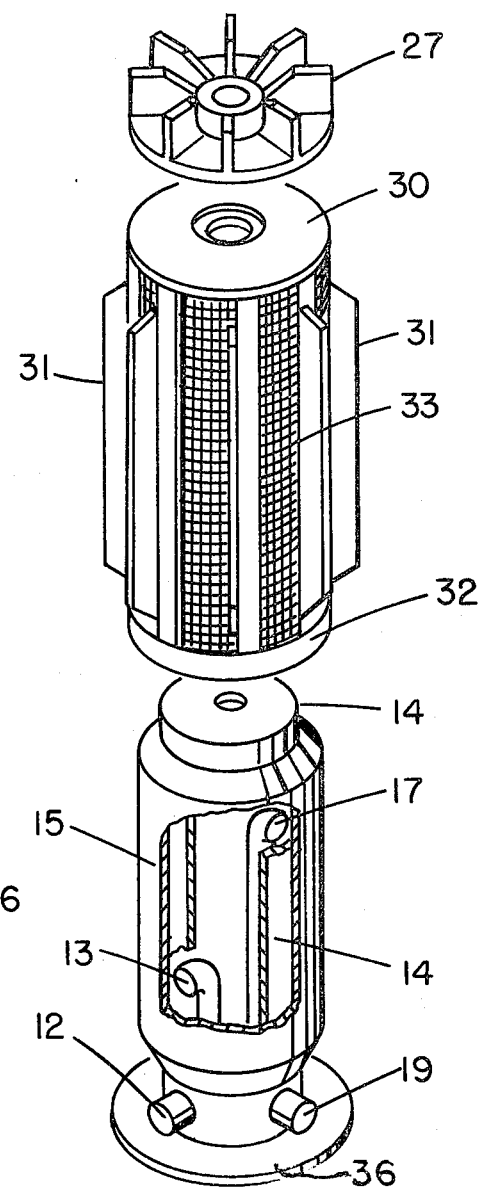
FIG 2
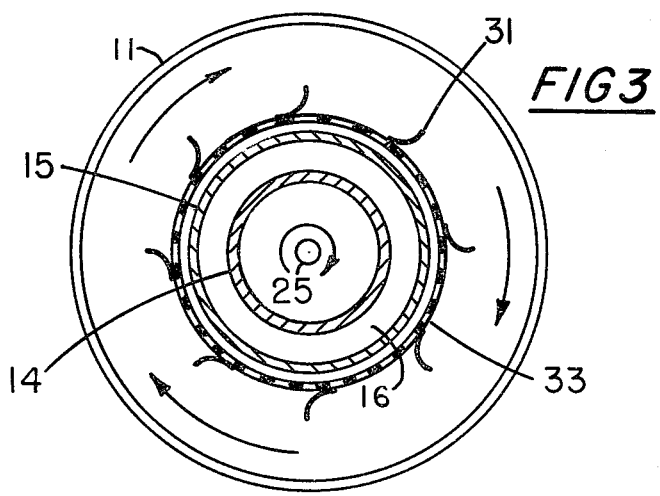
FIG 3
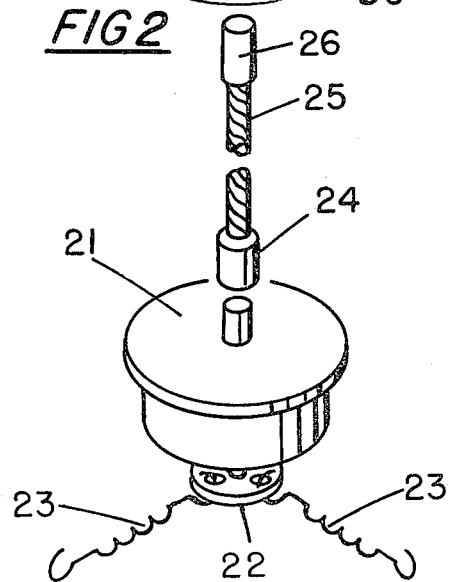

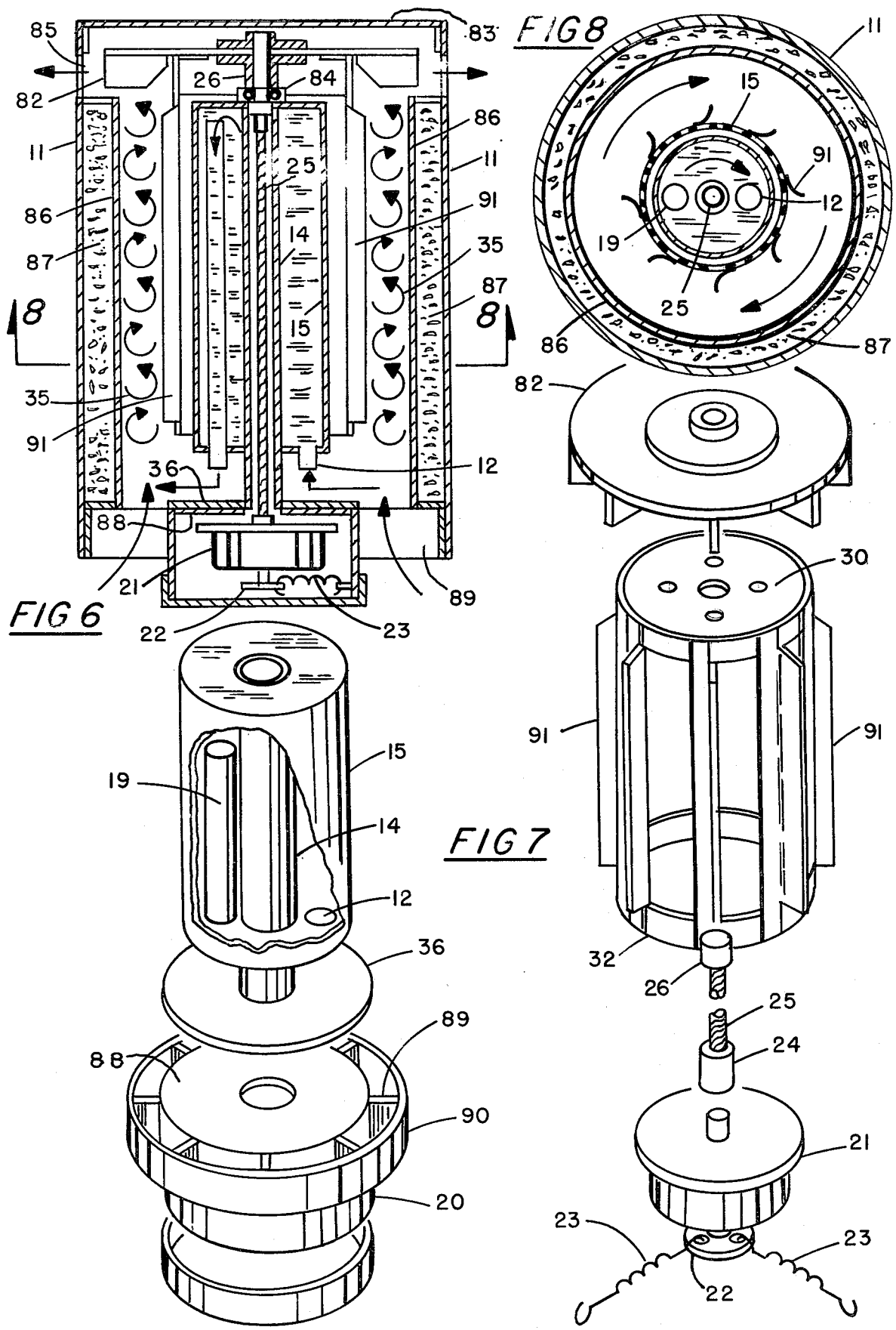

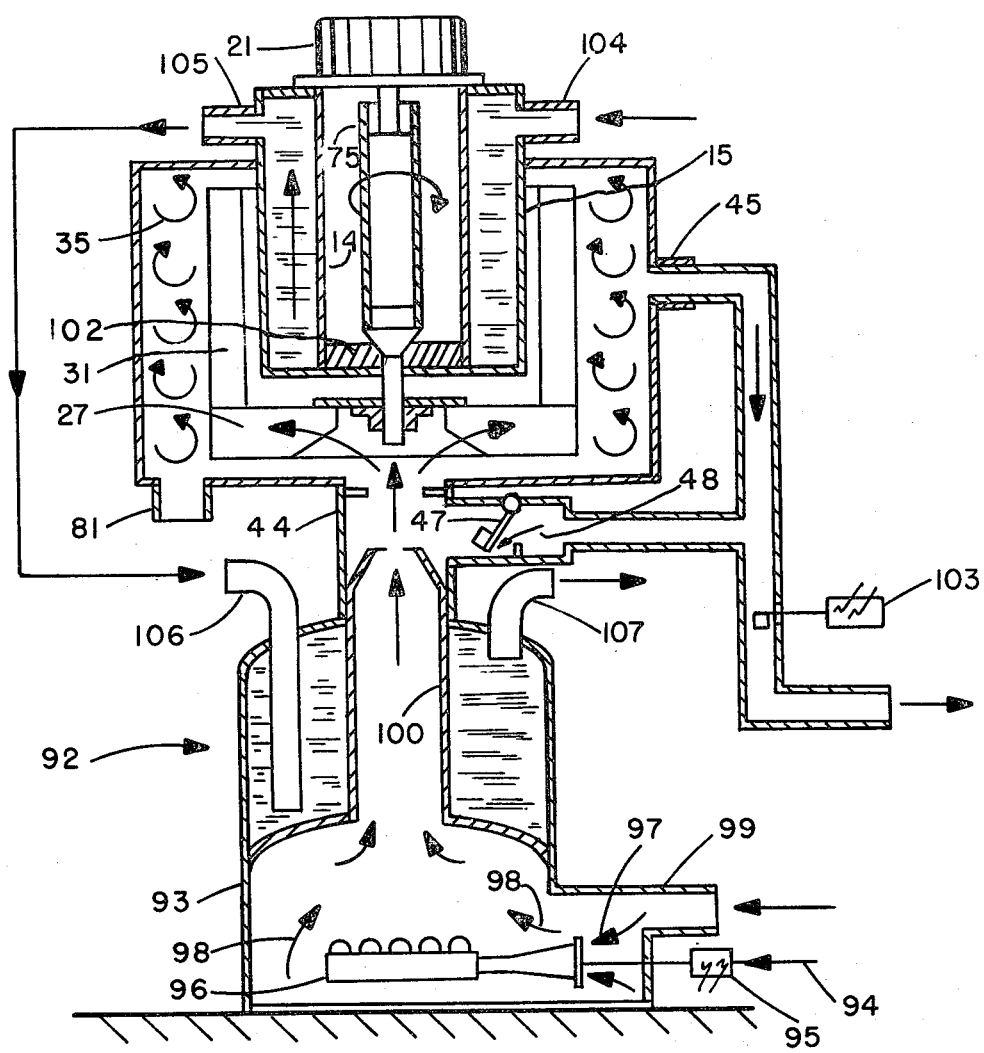
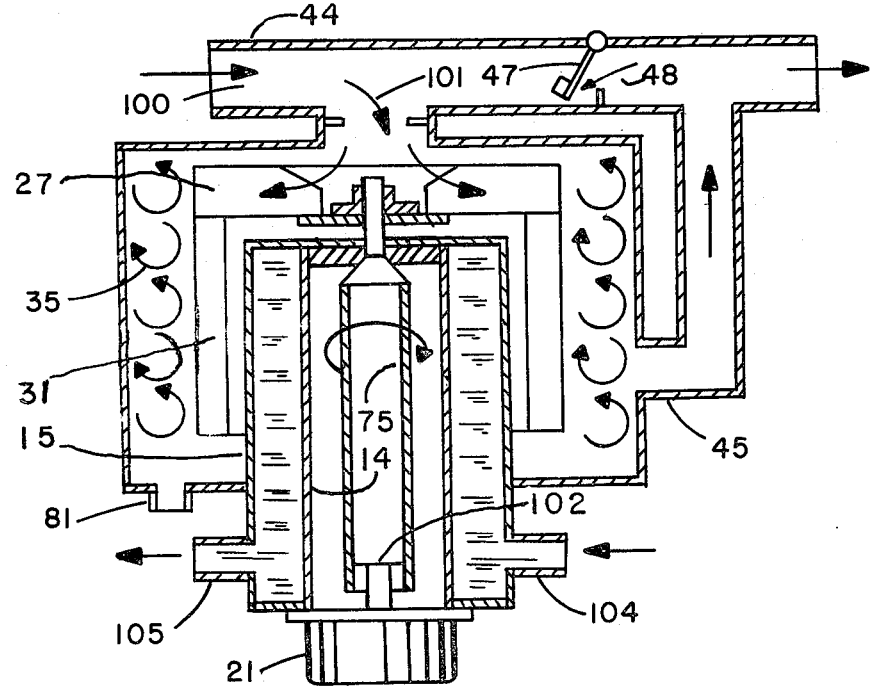

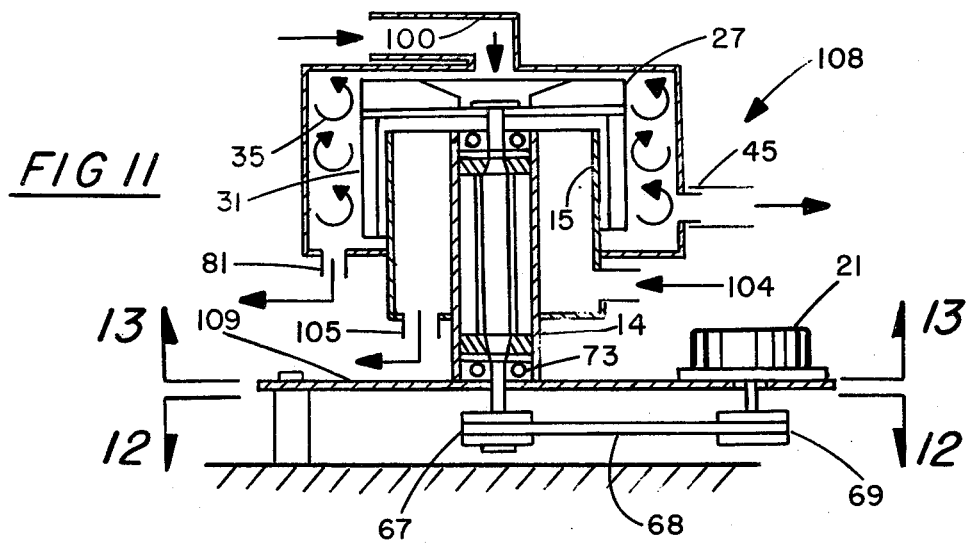
FIG 11
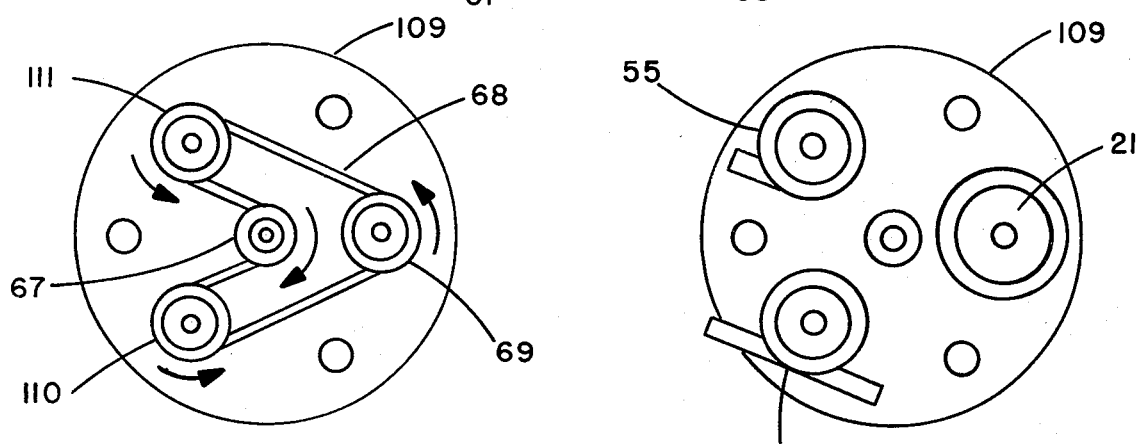
FIG 12
FIG 13
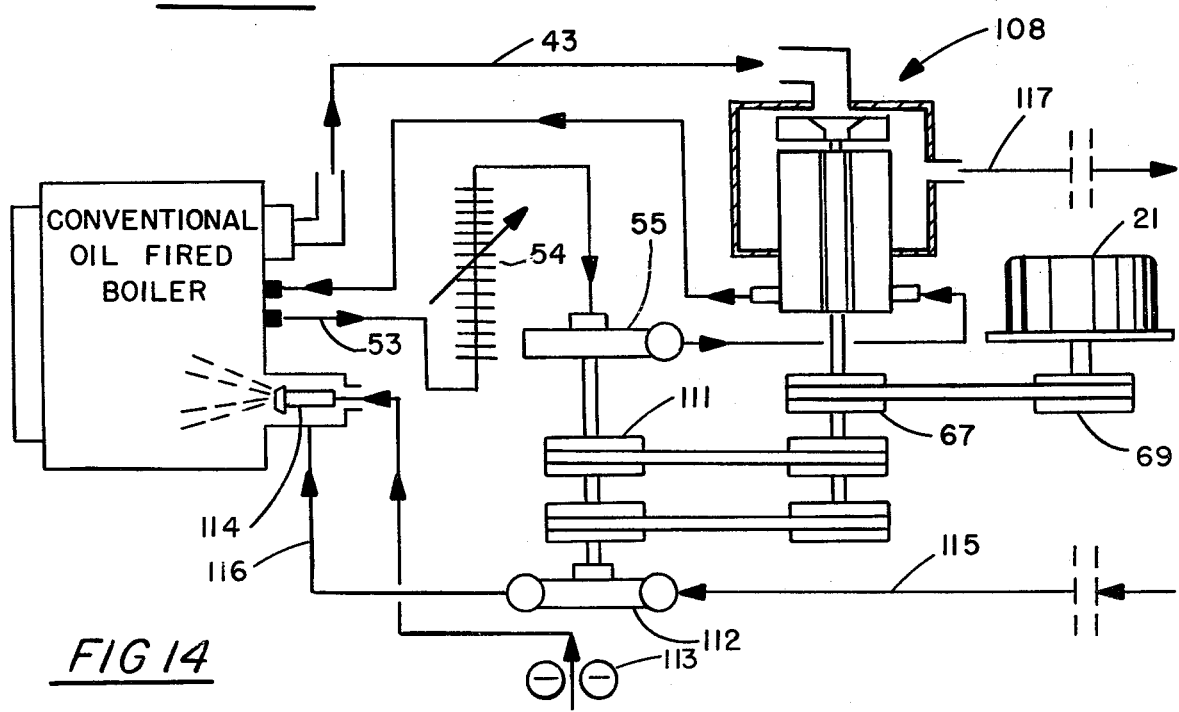
FIG 14

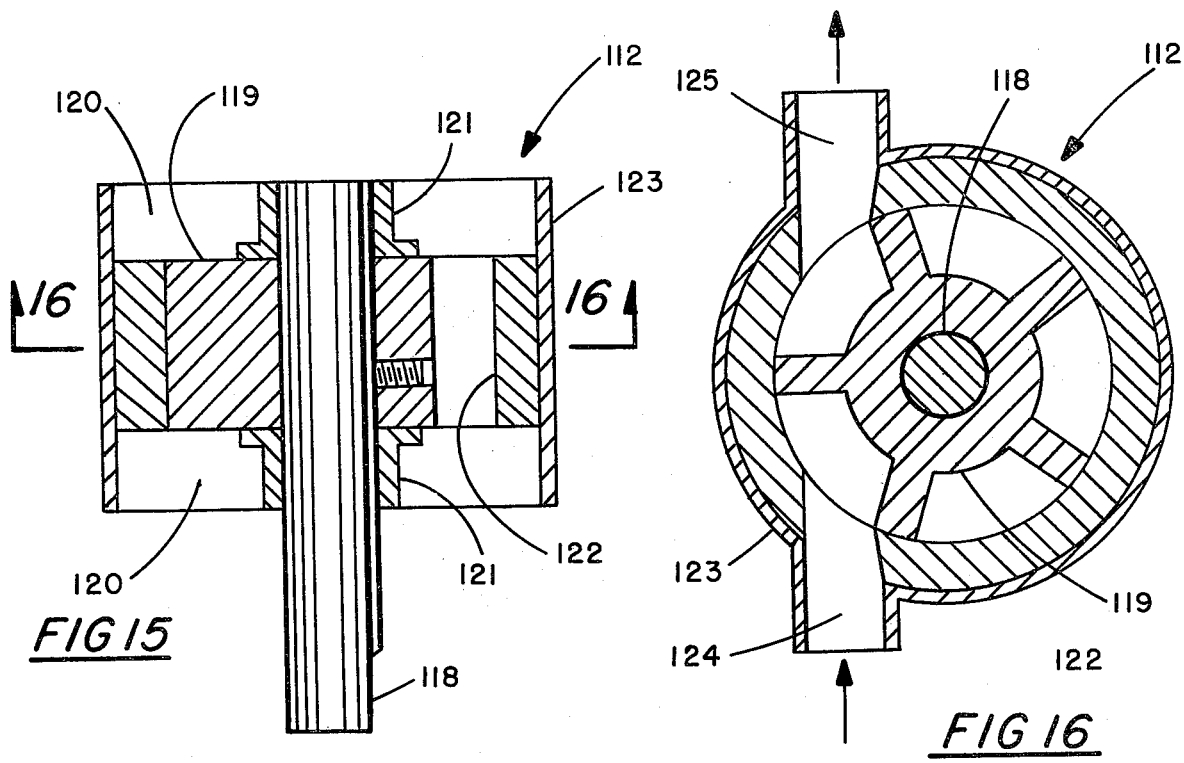
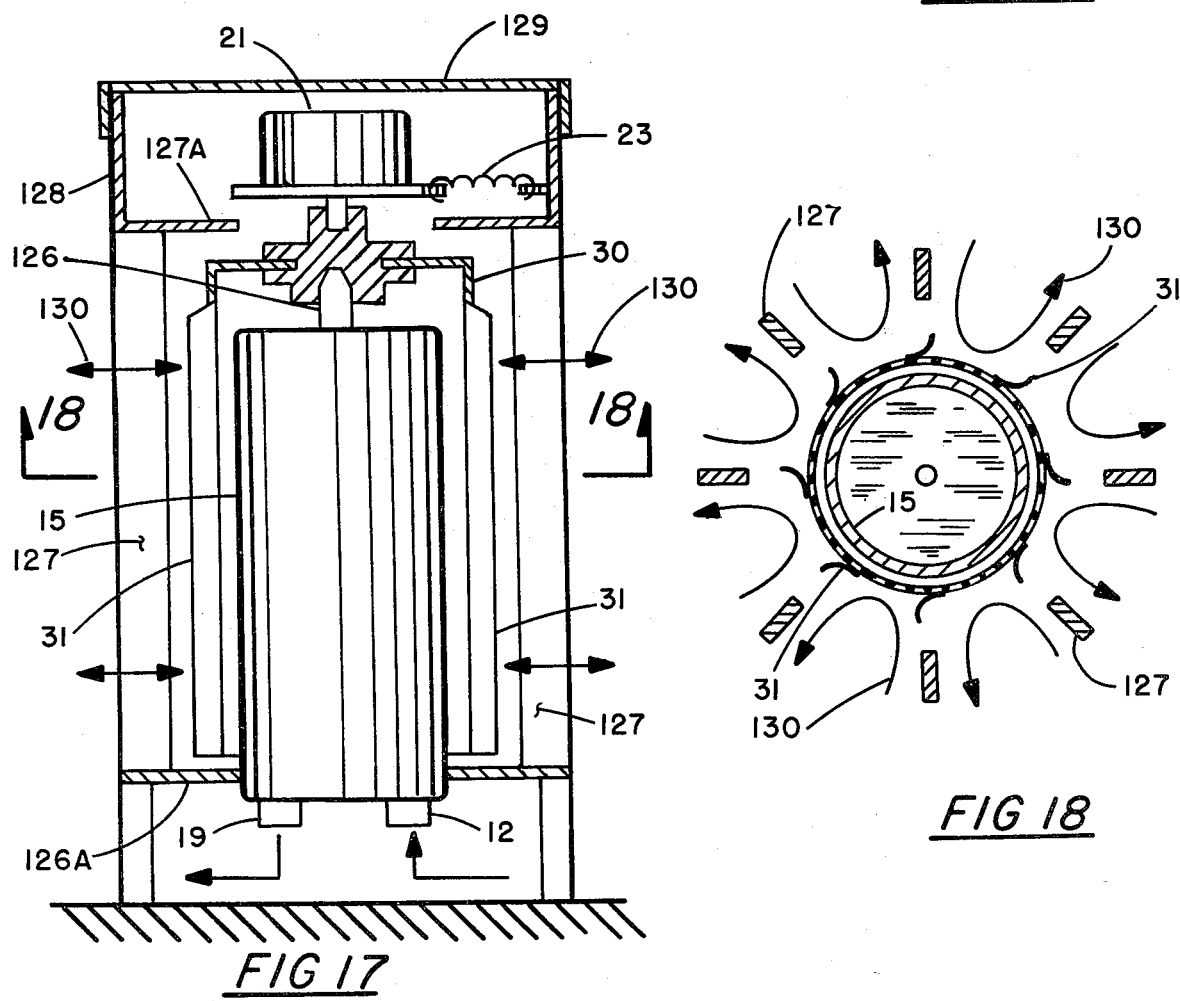

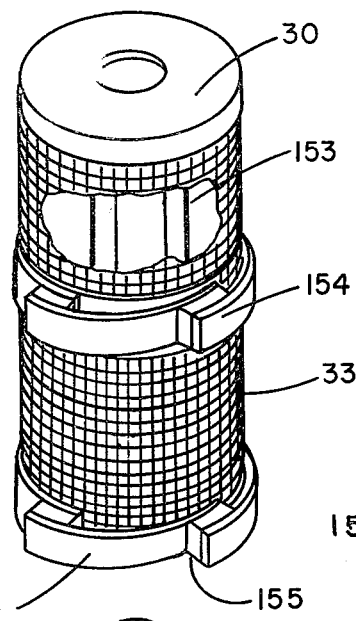
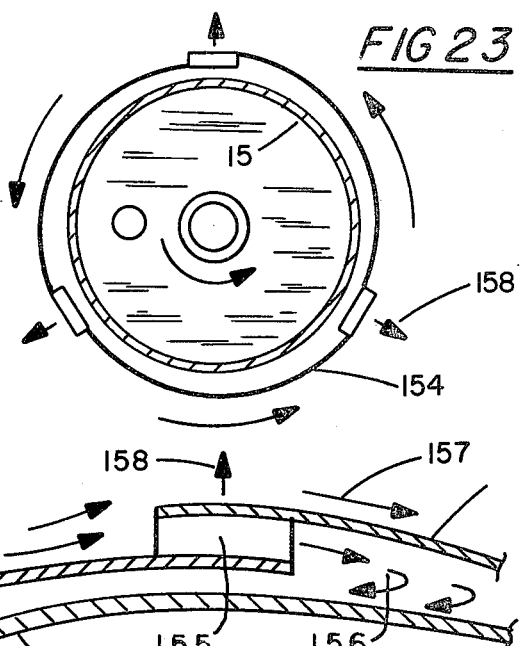
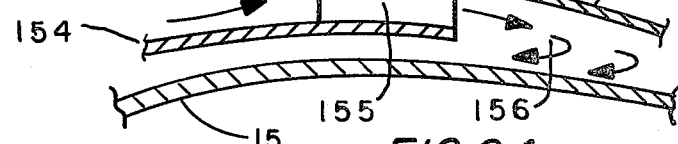
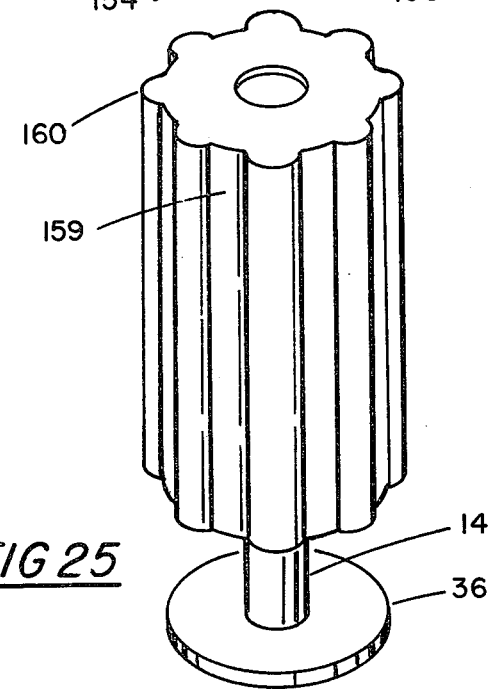
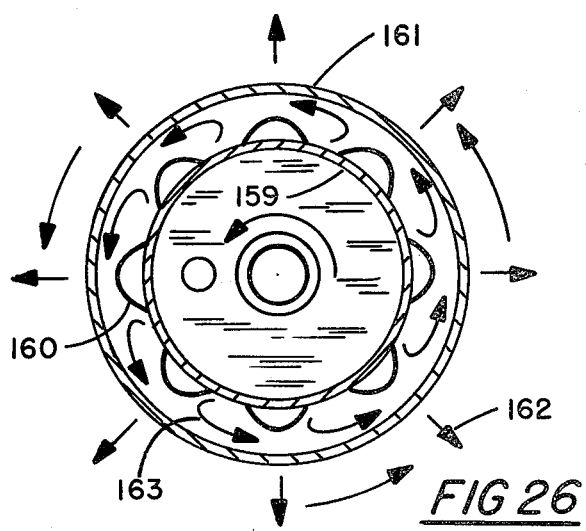
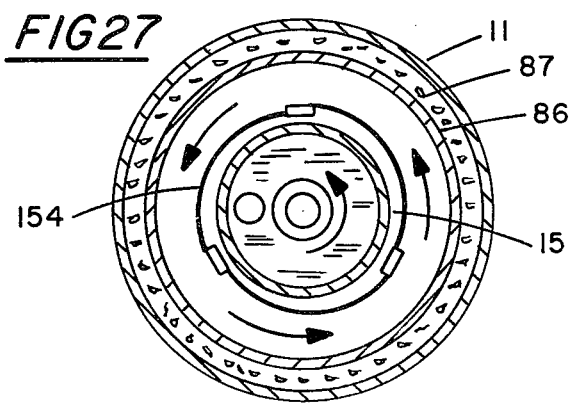
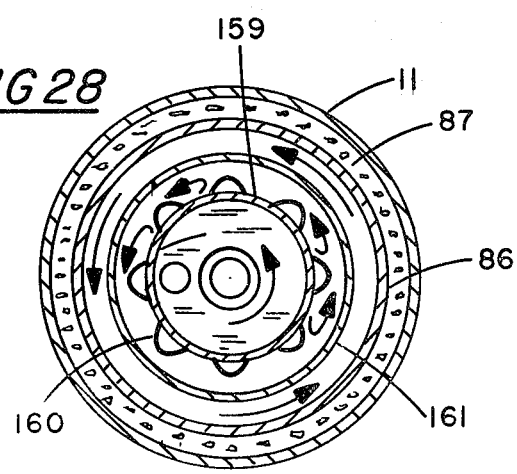

METHOD AND APPARATUS FOR IMPROVING HEAT TRANSFER

DESCRIPTION

The present invention relates to process and apparatus for improving heat transfer by mechanically stirring a fluid stream which is exchanging heat with a surface. The present invention is particularly concerned with mechanical stirring of a fluid stream about the outer surface of a generally cylindrical heat exchanger; and my co-pending U.S. patent application, Ser. No. 928,811, is particularly concerned with mechanical stirring of a fluid stream which is flowing through a generally cylindrical heat exchanger. The present invention also relates to process and apparatus for controlling the rate of fluid flow through stirred heat exchanger apparatus, particularly when the fluid is derived from combustion processes.

Conventional convective heat exchangers have several inherent disadvantages which have seriously limited their usefulness in the conservation of energy from dirty gaseous streams. Other inherent disadvantages have limited their usefulness in the many applications which require the exchange of energy through a surface between two streams when one stream is undergoing a phase change. More specifically, these inherent disadvantages of prior art heat exchangers and objectives of the present invention are as follows:

(1) Prior art heat exchangers require an increased fluid velocity over heat exchange surfaces in order to obtain an increased coefficient of convective heat transfer between the fluid and the heat exchange surfaces. They also require that an increased flow velocity over heat exchange surfaces be accompanied by an increased flow velocity of a larger fluid stream which is removed from heat exchanger surfaces and not effectively involved in a convective heat exchange process. Since any increased flow velocity necessitates a pressure drop which is proportional to the square of the velocity increase, prior art heat exchangers inherently involve a technical trade-off between the flow velocity which is required for an acceptable coefficient of heat transfer and the accessory power which is necessary to maintain this flow velocity.

An objective of the present invention is to provide a process and apparatus for mechanically stirring fluid at high relative velocity in the immediate vicinity of a fixed heat exchanger surface to obtain a high coefficient of convective exchange between the fluid and the surface. A further objective is to establish an unstable boundary layer in the fluid which is mechanically stirred, so that efficient mixing and heat exchange with surrounding fluid results with a minimum expenditure of accessory power.

(2) Prior art heat exchangers rely upon blowers and pumps to establish an overall pressure gradient across heat exchangers for maintenance of the local internal flow velocities which are required for convective heat transfer. No provision is made for limiting the growth of fluid boundary layers where low local flow velocities account for resistance to convective heat transfer. When compressible fluids are involved, it must also follow from the continuity equation that local flow velocities and convective coefficients must decrease as the specific density of the fluid stream increases. In applications requiring the conservation of energy from gas streams over an extended range of gas stream temperature levels, prior art heat exchangers clearly have inherent performance limitations.

An objective of the present invention is to provide uniform mechanical stirring of a fluid stream over an extended heat exchanger surface, so that fluid is subjected to a constant convection coefficient throughout the process regardless of specific density variations in the stirred fluid. It follows that a further objective of the present invention with uniform mechanical stirring is to eliminate the performance limitations due to fluid boundary layer development which characterizes the prior art heat exchangers.

(3) When prior art heat exchangers are used with partially condensing gases, condensate collection on heat exchanger surfaces poses an additional resistance to convective heat transfer. If the gases are dirty, the collection of dirt in the condensate further aggravates the heat transfer problem. When dirt is derived from combustion processes, its collection in condensate also poses fouling, and corrosion problems with prior art heat exchangers.

An objective of the present invention is to provide augmented convective heat transfer in condensing and dirty gaseous streams by mechanically stirring the boundary layer fluid surrounding the outer surface of a heat exchanger, so that dirt and condensate are centrifuged outwardly without forming a heat resisting film on the heat exchanger surface.

(4) In order to maximize the thermodynamic efficiency of any heat cycle, it is essential that heat be recovered for re-use in the cycle at the highest possible temperature level and that heat be rejected from the cycle at the lowest possible temperature level. Restated, it is mandatory that heat which is recovered for re-use in a cycle be in counter-current heat exchange with fluid which derives from the lowest heat-sink temperature level of the cycle. This is particularly true when it is necessary to recover latent heat energy from condensing combustion products. Aside from the fact that prior art heat exchangers are unable to maintain vigorous convective heat transfer to assure latent heat recovery at the lower end of the thermodynamic cycle, they are unable to properly recover this energy in counter-current flow relationship with the fluid which is returned for re-use or initially delivered to the cycle.

An objective of the present invention is to provide a process and apparatus for maximizing the thermodynamic efficiency of heat cycles by recovering useable energy in counter-current exchange with fluid from the lowest temperature level of the thermodynamic cycle which is involved.

(5) In order to utilize all available fuels and avoid air pollution problems, there is a critical need for a heat exchanger system which efficiently combines the functions of stack gas cleaning and energy conservation.

An objective of the present invention is to provide a simple and efficient means for stack gas scrubbing in many heating system applications solely with combustion generated condensate and without impairment of the heat exchange process. When water injection is used, a further objective is to recover the latent heat energy of the injected water for use in the adapt-heating system applications.

(6) Prior art heat exchangers have inherent limitations when it is necessary to exchange heat through a surface between two fluid streams with one stream undergoing phase change. Under these conditions, the local heat flux capacity for fluid condensing or evaporating from its pure vapor or liquid respectively is abnormally large compared with the local heat flux which is possible on the opposite side of the heat exchanger surface due to conventional convective systems. Since the fin efficiency of extended surfaces is low under these conditions, it is essential that the convective heat flux be augmented through prime surface for improved heat transfer. This requirement is present in a wide variety of energy consumptive technology including refrigeration equipment, heat pumps, heat pipes, steam heating, and process heating equipment.

An objective of the present invention is to provide a compact and efficient apparatus for the intense exchange of energy between two streams through a fixed surface when one stream is undergoing phase change, and the convective heat flux of the other stream is properly augmented through mechanical stirring of a prime heat transfer surface.

(7) In present residential and commercial burner-heat exchanger systems, high thermal losses occur through flue ducting during steady-state and off-cycle operation. During steady-state operation, there is no adequate means for maintaining the excess combustion air levels within narrow limits for acceptable performance and minimum thermal losses in the flue products. Efforts which have been made to improve the efficiency and capacity of conventional heat exchangers through internal flow restrictions and higher overall pressure drop have been frustrated by combustion instability and heat exchanger reliability problems. Under steady-state conditions, the maximum thermal efficiency of conventional heat exchangers is also limited by the occurrence of condensate from the combustion products within the heat exchangers. Since the present heating systems generally require the venting of combustion products through flue ducting which is subjected to the vagaries of natural draft and aspirated air from heated quarters, the steady-state efficiency of an existing heating system is dependent to some extent upon its application from the proper standpoint of the consuming public. During off-cycle conditions, most of the present burner-heat exchangers remove heat from heat exchangers through flue ducting by natural convection. Although this loss may be partially eliminated by installation of automatic stack dampers at the breech of the heat exchangers, heat may continue to be lost through flue ducting from the heated quarters. Although residential and commercial buildings are becoming better insulated, conventional burner-heat exchanger systems do not allow the combustion air to be derived from outside the heated quarters.

An objective of the present invention is to provide a combined economizer and draft control unit which may be retrofitted to all existing, or contemplated, burner-heat exchanger systems. A further objective is to allow the adapted heating systems to operate in their optimum and conventional manner with an air supply-flue system which is completely sealed from heated quarters. The invention allows high system efficiencies with the condensation of combustion products occurring solely in the economizer unit to avoid fouling and corrosion problems in the adapted conventional heating equipment. It allows the standby losses of present heating systems to be eliminated, so that the seasonal efficiency of an adapted heating system may be approximately the same as its elevated steady-state efficiency. A further objective of the present invention is to allow modulation of the firing rate of an adapted system in response to its thermostatic demands whenver this is desired.

A general objective of the present invention is to allow existing cost-effective structures, such as water storage tanks and the like, to be used as efficient prime-surface heat exchangers and energy storage means in combination with conventional solar energy systems, in-series heat pump systems, rate-scheduling utilities systems, and the like. A further objective is to utilize low-cost accessory components which are presently available and familiar to service personnel or amenable to low-cost and high-volume production.

In the embodiments of the invention which are described herein illustrative of certain applications of this invention, fluid near the outer surface of an extending generally cylindrical heat exchanger is mechanically stirred with stirring energy supplied from an external source. The heat exchanger components provide central bearing means near an end for the rotating stirring mechanism; and the stirring mechanism is supported over an extended length by an hydrodynamic film which its elements generate when rotating near the fixed heat exchanger surface. The hydrodynamic film is generated from the fluid undergoing heat transfer, and the stirring elements are constrained from centrifuging outwardly by circumferential supports which also uniformly attach the stirring elements. The stirring elements and/or stirred surface are arranged to stabilize the generation of the hydrodynamic support film and allow rotation of the mechanism near the heat exchanger surface. The stirring elements and stirring mechanism are also arranged to generate an unstable turbulent boundary layer in the fluid near the heat exchanger surface where heat transfer resistance normally occurs. It also provides for the exchange of fluid outwardly and inwardly relative to the stirred boundary layer in an orderly vortex pattern, in accordance with Sir Geoffrey Taylor's "Vorticity Transport Mechanism" which is extensively covered in the classical scientific literature and familiar to students of convective heat transfer, lubrication, and fluid boundary layer theory. Various arrangements of the mechanical drive mechanism are disclosed which permit operation at high rotative speeds with dynamic stability and mechanical simplicity compatible with in-field heat exchanger technology. In most embodiments, the stirring mechanism is integrated with a fan or pump element which moves fluid through the stirred heat exchanger under controlled conditions.

In accordance with the present invention, several distinctions, features, and advantages are among those which are provided relative to my co-pending U.S. patent application, Ser. No. 928,811, and other prior art. These distinctions, features, and advantages may be summarized as follows:

1—BOTTOM-CYCLE ENERGY CONSERVATION

When the present invention is used in the conservation of energy from dirty gaseous streams, it allows:

(a) Uniform external stirring of the gaseous stream relative to prime heat exchanger surface while the gases may undergo wide variations in specific density, (b) Removal of dirt and condensate outwardly from the stirred heat exchanger surface without generating restriction in the fluid flow through the heat exchanger, (c) Utilization of counter-current heat transfer to maximize thermodynamic efficiency and convective performance of the system, (d) Involvement of the relatively dense bottom-cycle gases in externally stirred heat exchangers with abnormally long physical residence times while the gases are undergoing vigorous convective heat transfer, (e) Generation of unstable boundary layer with external stirring of fluid undergoing heat transfer to assure uniform mixing and efficient involvement of the entire fluid stream in the heat exchange process, and (f) Optical use of existing storage tanks and pressure vessels, which are amenable to application of external corrosion resistant coatings, as high-performance convective heat exchangers with additional energy storage functions.

2—ACCESSORY POWER UTILIZATION

Unique features of the present invention from the standpoint of efficient utilization of accessory power for convective heat transfer augmentation involve:

(a) Primary application of mechanical stirring energy to fluid film surrounding heat exchanger surface where heat transfer resistance normally occurs, (b) Use of relatively large annular flow area for fluid throughput surrounding stirred heat exchanger, so that small overall pressure differential or pumping power is necessary to maintain optimum heat exchanger throughput, (c) Recirculation of surrounding fluid to stirred heat exchanger with augmented Taylor vorticity pattern to provide energy efficient mixing and heat exchange process with main fluid stream, (d) Use of fluid fan and pump elements in symmetrical annular housing with heat exchanger external stirring mechanism to avoid cut-off, diffuser, ducting, and entrance losses of prior art systems, and (e) Allowing reduced accessory power associated with effective bottom-cycle heat transfer and removal of condensible portion of entering gases in most applications.

3—PROCESS HEATING APPLICATIONS

The present invention offers unique advantages in many process heating applications where the temperature differential between a heat source and a processed fluid must be accurately controlled. An externally stirred heat exchanger of the present invention allows (a) Induction of hot and dirty gases from any source, such as the combustion of coal or incinerated waste products, into externally stirred heat exchanger, (b) Injection of water at a controlled rate into gas stream entering heat exchanger to evaporatively cool and adjust the gas stream temperature to its optimum level for the process application, (c) Practice of augmented convective heat transfer and gas scrubbing with external stirring mechanism, and (d) Recovery of latent heat of the injected water in the final stages of the heat transfer process with rejection of fuel impurities without fouling and erosion problems of the stirred heat exchanger.

Since this invention also allows the combustion of coal in a hot-gas generated with humid combustion products inducted into the stirred process heat exchanger, it circumvents the present difficulties of uncontrollable radiant heat flux and erosion of convective surfaces which are present in the prior art systems.

4—STIRRED HEAT EXCHANGERS WITH INTERNAL FLUID UNDERGOING PHASE CHANGE

The present invention may be used to improve the exchange of heat through a surface between two streams when mechanical stirring is applied to the stream-side having the greater resistance to convective heat transfer. It offers special advantages, however, when a relatively pure fluid undergoes phase change inside of the externally stirred heat exchanger, since (a) Negligible pressure drop is involved in the stream undergoing condensation or evaporation inside the externally stirred heat exchanger, (b) Several prior art methods are available for producing thin-film vaporization or condensation on the inner surface of the heat exchanger with potential for abnormally high specific conductance for the internal surface heat transfer, (c) Comparable convective coefficients may be obtained through the outer surface of the heat exchanger through augmentation with mechanical stirring, and (d) Relatively high initial costs and operating costs of conventional fan-blown extended surface systems may be avoided.

5—ECONOMIZER SYSTEMS WITH BURNER DRAFT CONTROLS

Aside from the advantages which have been recited for the present invention in the conservation of bottom-cycle energy from combustion processes, it offers additional advantages as an economizer in which (a) The combustion air for the adapted heating system is regulated with conventional draft regulators in combination with the economizer unit to eliminate losses to the flue system from heated quarters, (b) The combustion air supplied to the burner is regulated volumetrically with a rotary meter which is driven by the economizer unit and provides a positive cut-off on shut-down and steady-state flow control without by-passing of gases within the economizer unit, (c) Combustion air regulation in all cases also allows the burners to be fed from an air source which is external to the heated quarters and preferably at a pressure level which balances the pressure at the flue product discharge, and (d) The economizer allows the adapted heating system to operate in its optimum mode without resonant coupling and with a sealed flue duct providing forceful venting of combustion products through small-diameter ducting to any desired point for discharge. The mechanical stirring action of the economizer avoids resonant wave propagation within the flue ducting and resonant coupling with the burner-heat exchanger combination. Aside from other considerations, it is not possible to improve the efficiency of prior art burner-heat exchanger systems through constriction of heat exchanger flow passages without encountering combustion stability problems, particularly with extended and sealed flue ducts.

6—GENERAL APPLICATIONS

In view of the need to efficiently utilize alternate energy sources and provide storage of energy which may only be available on a cyclic or intermittent basis, the present invention also allows (a) Water storage tanks, or any generally circular storage containers for thermal energy, to be used, on demand, as efficient and cost-effective heat exchangers in combination with the variety of energy sources which may be available in residential and commercial heating/cooling practice.

The various aspects, objects and advantages of the present invention will in part be pointed out and will in part become apparent from the following description when considered in conjunction with the accompanying drawings, in which:

FIG. 1 is a side elevational view of an embodiment of the present invention in which fluid is flowing over the external surface of an annular heat exchanger which is mechanically stirred over the length of the heat exchanger with a co-axial and self-centering drive means;

FIG. 2 is an exploded view in perspective of several components comprising the embodiment of FIG. 1;

FIG. 3 is a cross-sectional view of the stirred heat exchanger embodiment along the plane 3—3 of FIG. 1 looking upwardly;

FIG. 6 is a side elevational view of a centerflue water storage tank, or the equivalent, which is utilized as a high-performance convective heat exchanger with external mechanical stirring in accordance with the present invention;

FIG. 7 is an exploded view in perspective of several components comprising the embodiment of FIG. 6;

FIG. 8 is a cross-sectional view of the stirred heat exchanger embodiment along the line 8—8 of FIG. 6 looking upwardly;

FIG. 9 is a side elevational view of a conventional gas-fired water heater and stirred heat exchanger in accordance with the present invention which functions as an economizer and draft control for the adapted gas-fired water heater;

FIG. 10 is a side elevational view of a stirred heat exchanger involving the present invention when operating in an inverted position relative to the embodiment of FIG. 9 and functioning as an economizer and combustion air control for all combustion actuated heating equipment;

FIG. 11 is a side elevational view of a stirred heat exchanger in accordance with the present invention which functions as an economizer and permits positive volumetric metering of the combustion air flow which is induced by the economizer into an adapted burner and heat exchanger system;

FIG. 12 is a cross-sectional view of the accessory mounting arrangement when viewed downwardly in the plane 12—12 of FIG. 11;

FIG. 13 is a cross-sectional view of the accessory mounting arrangement when viewed upwardly in the plane 13—13 of FIG. 11;

FIG. 14 is a schematic diagram showing the heat exchanger of FIG. 11 when employed as an economizer and volumetric draft control for conventional oil-fired boilers;

FIG. 15 is a side elevational view of the volumetric draft control component which is incorporated in the stirred heat exchanger and accessory system of FIG. 11;

FIG. 16 is a cross-sectional view of the volumetric draft control component when viewed upwardly along the plane 16—16 of FIG. 15;

FIG. 17 is a side elevational view of an externally stirred cylindrical heat exchanger in accordance with the present invention in which the drive mechanism is pivotably mounted on an end of the heat exchanger and heat is exchanged with ambient fluid which is propelled inwardly and outwardly by the stirring mechanism;

FIG. 18 is a cross-sectional view of the stirred heat exchanger when viewed upwardly in the plane 18—18 of FIG. 17;

FIG. 22 is a view in perspective of an optional stirring mechanism of this invention which utilizes rotating resilient foil bearings for supporting and stabilizing stirring elements relative to the externally stirred heat exchanger surface;

FIG. 23 is a cross-sectional view of a stirred heat exchanger in the plane of a resilient foil bearing as shown perspectively in FIG. 22;

FIG. 24 is a cross-sectional view of a localized portion of the rotating foil bearing of FIG. 22 and FIG. 23 illustrating the hydrodynamic lift and stabilizing features of the bearing relative to the conventional heat exchanger surface;

FIG. 25 is a view in perspective of a cylindrical heat exchanger modified in accordance with the present invention to provide fixed longitudinal bearing supports on the heat exchanger surface for the externally rotating foil bearing elements;

FIG. 26 is a cross-sectional view of a cylindrical heat exchanger as shown in FIG. 25 when viewed in the plane of a resilient foil bearing and illustrating the stability and uniform radial loading of the bearing relative to the stirred surface;

FIG. 27 is a cross-sectional view of a cylindrical heat exchanger and outer housing which incorporates the foil bearing support of FIG. 22 and FIG. 23;

FIG. 28 is a cross-sectional view of a cylindrical heat exchanger and outer housing which incorporates the integral longitudinal supports shown in FIG. 25 and rotating resilient foil bearing shown in FIG. 26;

Figure 29:
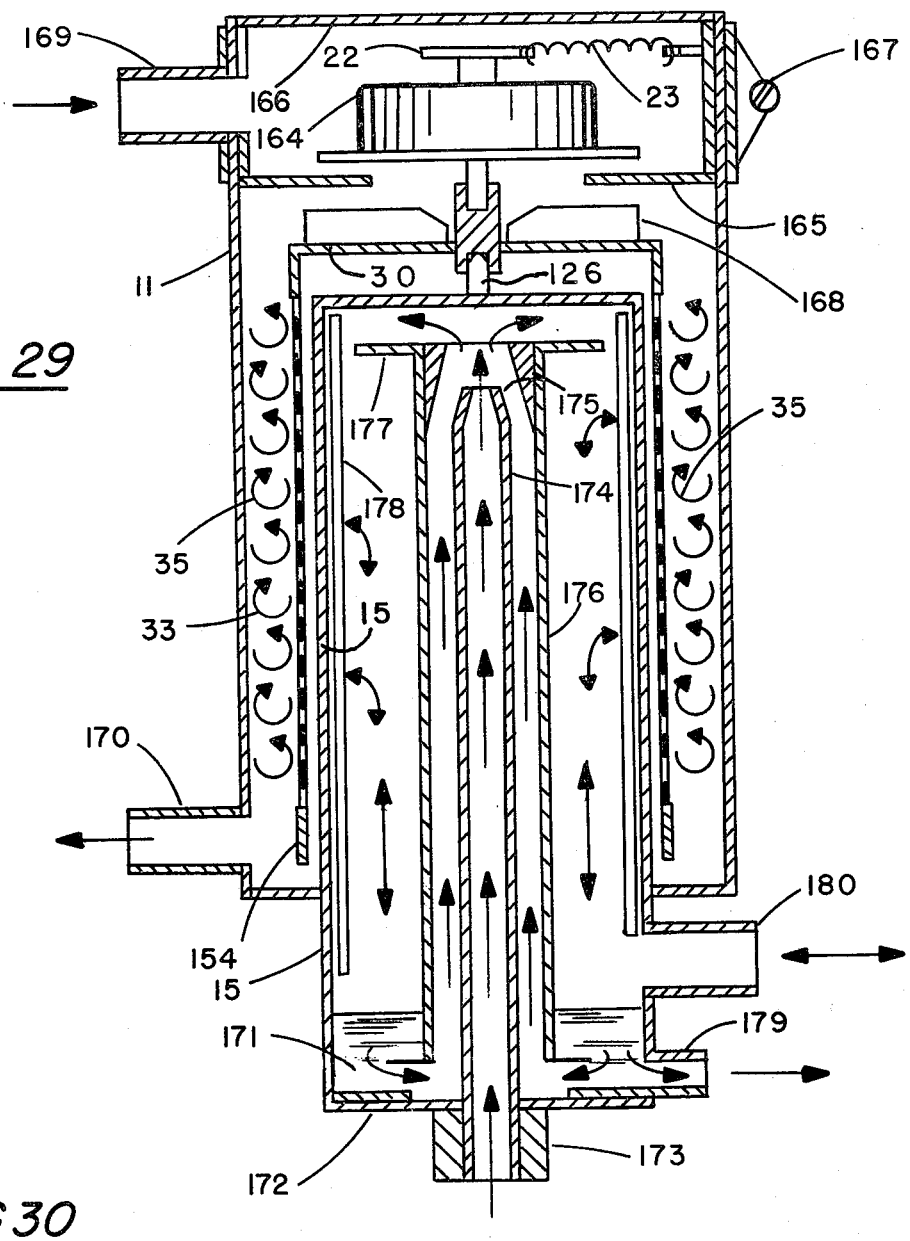
Figure 30:
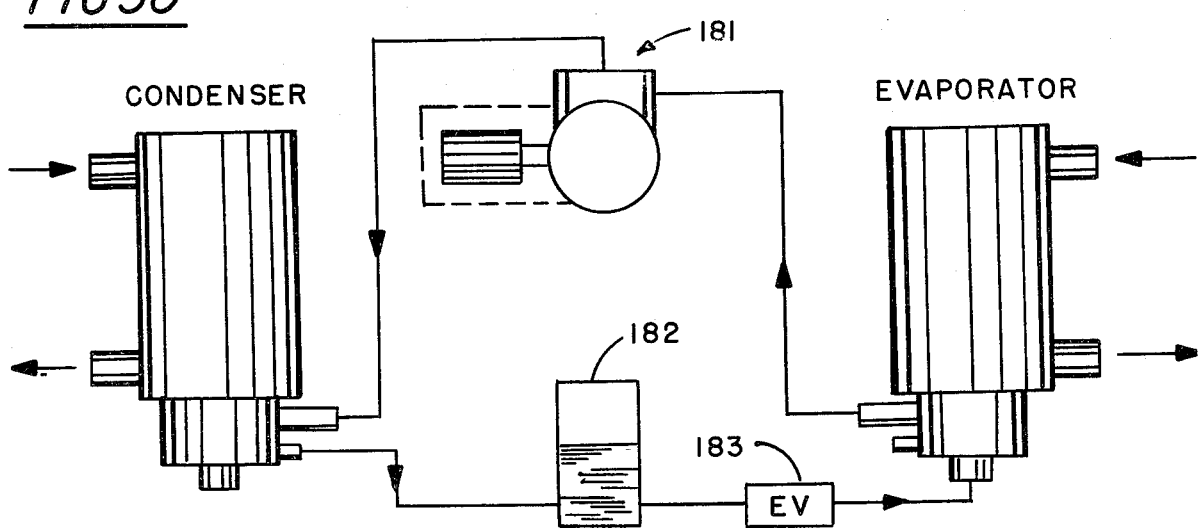

FIG. 29 is a side elevational view of a stirred heat exchanger in accordance with the present invention when utilized in refrigeration and water-source heat pump practice; and FIG. 30 is a functional diagram of a refrigeration system employing the present invention with stirred heat exchanger components operating in the condensing and evaporating modes with circulating water, or other liquid, used as heat source and sink.

Referring specifically to FIG. 1 of the accompanying drawings, the heat exchanger assembly 10 includes an outer generally cylindrical housing 11 which is vertically oriented. It also includes an annular and cylindrical heat exchanger section having an outer shell 15 and an inner shell 14. The outer shell 15 of the heat exchanger section in combination with the outer housing 11 defines an annular flow path for air or other fluids while undergoing mechanical stirring and augmented convective heat transfer relative to the heat exchanger outer shell 15. Liquid is delivered to the heat exchanger section through an inlet port 12 and an interconnecting tube section 13. The inlet port 12 is preferably welded to an extension of the inner shell 14 of the annular heat exchanger, and the ends of the interconnecting tube section 13 are preferably brazed to define sealed connections for fluid flow. This arrangement also allows the full length of the outer shell 15 of the heat exchanger to be available for mechanical stirring. Fluid delivered to the annular heat exchanger section is then circulated upwardly 16 through this section and in counter-current relationship with respect to air, or other fluid, which is stirred about the outer shell 15 of the heat exchanger. After traveling through the annular heat exchanger section and completing its heat exchange process, the fluid is returned through an interconnecting tube 17 within the inner shell of the heat exchanger section 14 to an outlet port 19 which is also welded to the outer surface of the lower extending portion of the inner shell 14.

During operation, the drive motor 21 which is of conventional construction, although incorporating at least one ball bearing or other bearing capable of operating with the equivalent of the motor weight in axial thrust, provides power for the heat exchanger external stirring mechanism through a resilient drive shaft 25. This resilient drive shaft 25 is pinned to the upwardly extending motor shaft by an adapter coupling 24. The lower end of the drive motor is tethered in position by three or more tension springs 23 which are anchored to a lower disc 22 or projection of the motor housing and lower support structure of the heat exchanger assembly. In this arrangement, the drive motor 21 which is suspended by the resilient drive shaft 25 (a) permits the use of an extended stirred heat exchanger section (b) with a self-centering and vibration-free drive (c) which is of simple and low-cost construction (d) adaptable to sheet metal structural components without alignment problems and (e) allows the drive motor 21 to be situated in a cool zone beneath the heat exchanger assembly without exposure to varying humidity and corrosion conditions in the fluid stream which is undergoing heat transfer.

The upper end of the resilient shaft 25 terminates in a rigid rod section 26 which is pinned to the hub of a radial-bladed fan element 27 which is also keyed and attached to the upper support disc 30 of the external stirring mechanism for the heat exchanger. The fan element 27 may be fabricated by spot welding radial blades to a sheet metal disc having a diameter which approximates that of the upper support disc 30, so that the fan disc and upper support disc 30 may be juxtaposed and attached for mutual support. The lower surface of the support disc 30 of the stirred heat exchanger is also mounted on a flanged hub which terminates in a lower conical section. This conical section is supported for rotation in a bearing cup 29 which may contain graphite-impregnated bearing material, or the like. The rigid rod section 26 of the drive shaft maintains a coaxial relationship with the heat exchanger support disc 30, lower flanged hub with conical pivot section, and the fan element 27. This arrangement (a) provides a light-weight and rigid structure which (c) allows thermal shielding and isolation of the upper support disc 30 from the incoming hot and corrosive gases which may be involved in certain applications, and (d) permits the driven heat exchanger support disc 30 to have a vibration-free operation with an axial pivot which is properly indexed to the stirred heat exchanger. The drive mechanism has no critical dependence on external support structure, and the arrangement is amenable to low-cost production.

In the preferred embodiment, the upper support disc 30 of the heat exchanger stirring mechanism generates a lower circumferential flange by stamping or other means. Aside from providing structural stability, this arrangement allows spot welding of the upper ends of sheet metal stirring elements 31 to the circumferential flange portion of the upper support disc 30. The stirring elements 31 are attached at their upper ends by flat metal extensions which allow radial flexibility and resilient coupling with the upper support disc 30. Over the length of the stirred heat exchanger surface 15, the extending stirring elements generate short radial blade sections which provide longitudinal rigidity. As shown in FIG. 2 and FIG. 3, the blade elements are are also formed by bending from flat sheet metal stock, so that they generate a radius of curvature near the inner radius of the radial blade sections. When the radial blade sections are rotated relative to the fixed heat exchanger surface as shown, a fluid film is maintained between the fixed surface and flat or circumferential portion of the stirring elements 31. This fluid film is generated from the fluid stream which is continuously induced through the system and undergoing convective heat transfer. In this embodiment of the stirring mechanism, the lower ends of the stirring elements 31 are equally spaced and spot welded to a circumferential band 32 which is closely fitted for rotation about the fixed cylindrical heat exchanger surface 15. This circumferential band 32 constrains the stirring elements 31 from centrifuging away from the stirred surface 15. Since the circumferential band is flexible, it also allows the stirring elements 31 to be uniformly stabilized on a fluid bearing relative to the fixed heat exchanger surface. In the embodiment as shown in FIG. 2 and FIG. 3, the stirring mechanism also incorporates a lightweight wire cloth cylindrical sheath 33 which is spot welded to the flanged portions of the upper support disc 30, stirring elements 31, and lower flexible circumferential band 32. Although the technical features of this stirring mechanism will be discussed in greater detail elsewhere, it may be noted that this arrangement (a) provides a simple, light-weight and low-cost structure (b) which may conform to cylindrical heat exchangers which are commercially available and (c) allows the stirring energy to be supplied uniformly to the boundary layer film of the heat exchanger where resistance to convective heat transfer normally occurs. Aside from supplying structural rigidity and integrity to the stirring elements 31, the wire cloth sheath 33 effectively turbulates the boundary layer film over the entire heat transfer surface. It also offers special features from the standpoint of augmenting convective heat transfer in accordance with the Taylor vorticity transport mechanism which is discussed elsewhere.

As shown in FIG. 1, the outer shell of the heat exchanger assembly 11 is sealed at its upper end with a band clamp 18 against an upper sealing disc 28 which generates an internal circumferential flange and sealing surface. The lower end of the outer shell 11 is also sealed with a band clamp 38 against a lower internal housing having circumferential sealing walls and a flat annular bottom 37. A flange 36 which is welded to the lower end of the extended inner heat exchanger shell 14 is bolted or otherwise sealed against the upper surface of the annular bottom 37 to maintain the heat exchanger rigidly and co-axially with respect to the outer housing 11. The band clamp 38 preferably generates an outlet port 45 for the discharging gases or other fluid which has undergone heat transfer. This arrangement provides a simple and low-cost structure which is positively sealed and conveniently dissassembled.

During operation, rotation of the fan element 27 sets up a low static pressure zone 20 at the inlet and induces the flow of fluid into the assembly to undergo heat transfer. Since the fluid discharges radially outwardly into an annular housing without flow restrictions and cut-off points, the fan element 27 and stirring mechanism is not subjected to uneven side thrusts or precessional forces. It may also operate at high rotative speeds without the aerodynamic noise associated with conventional blowers and combustion systems which must incorporate such fluid cut-offs with associated noise and fluid diffuser losses.

A feature of the present invention involves the use of a large annular flow area for the gases or other fluids which are undergoing mechanical stirring and augmented convective heat transfer. This flow area is sufficient to allow negligible pressure differential across the stirred heat exchanger section and maintenance of a flow rate which is optimum for any reasonable application of the heat exchanger. Restated, the internal annular volume of this stirred heat exchanger is large for the volumetric throughput which it is required to accomodate, relative to conventional heat exchanger practice. Since the physical residence time of the fluid undergoing heat transfer is equal to the quotient of the physical volume of the heat exchanger and its volumetric throughput rate, the characteristic residence time of this heat exchanger is abnormally large compared with conventional convective heat exchanger practice.

Another feature of the present invention involves the efficient convective exchange of heat between the inner stirred surface 15 and the bulk stream which is moving with low axial pressure differential due to a practicable implementation of the Sir Geoffrey Taylor Vorticity Transport Principle. In accordance with this Principle, the stability of fluid contained between concentric rotating cylinders may be analytically defined in terms of the rotational speeds of the cylinders, ratio of their radii, and certain fluid properties. When a calculable Reynolds number of the flow is just exceeded, a definite mode of disturbance appears. This instability consists of alternate ring-shaped vortices 35 which are symmetrical about the axis of the cylinders and spaced definite distances apart. Although several groups have been preoccupied with the Taylor Vorticity Transport Mechanism over the past fifty-seven years and analyzed its potential for augmenting convective heat transfer with both liquids and gases, all of these studies have been restricted to the viscous drag effects of smooth-surface cylinders rotating in gases or water. Heat transfer augmentation which is proportional to the rotative speed of cylinders in such heat transfer fluid has been repeatedly demonstrated. Unfortunately, these studies have been involved with rotating cylinders, multiple rotating seals, and other mechanical complexities which are impractical in heat exchanger practice. The present invention utilizes the Taylor Vorticity Principle and circumvents the mechanical complexities which have been mentioned by (a) vigorously stirring a relatively large heat exchanger surface which is fixed, (b) avoiding the viscous drag limitation of the heat exchanger surface to initiate Taylor vortices, (c) applying external and experimentally controllable accessory power to the boundary layer film where heat transfer limitations normally occurs, and (d) utilizing the vorticity mechanism with a relatively large annular flow area to uniformly and efficiently involve the bulk stream in the convective heat transfer process with minimum expenditure in fluid pumping power across the heat exchanger component. The external stirring of a heat exchanger surface provides the additional advantage for dirty gases and gases undergoing condensation in bottom-cycle energy applications of removing dirt and condensate from the heat exchanger surface and away from the heat exchanger component without impairment of its performance. The Nusselt limitation in film-wise heat transfer is avoided. Since the stirred surface is prime surface, it also avoids the fin efficiency factor which is presently limiting in convective systems, particularly when condensation or evaporation occurs with high heat transfer conductance on the heat exchanger side opposite the extended surfaces. The pressure drop, corrosion, fouling, and and initial cost problems of extended surface systems are avoided by the present invention.

Figure 4:
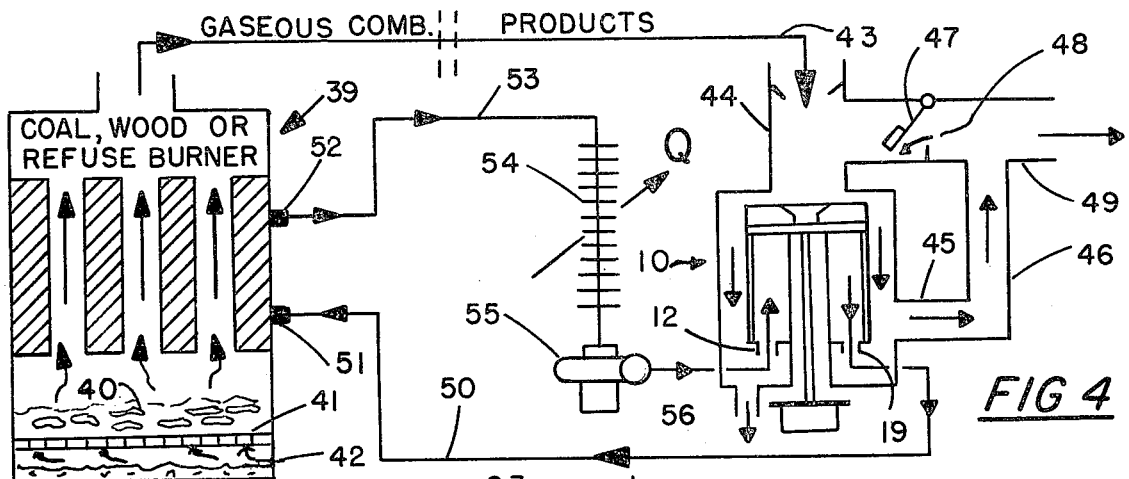
FIG. 4 is a schematic diagram showing the heat exchanger of FIG. 1 employed as an economizer and combustion air draft control means for coal, wood, or refuse-fired existing boilers or burners which presently have high thermal losses and combustion air draft control problems.

Since the stirred heat exchanger 10 incorporates a fan 27 which induces the flow of gases or fluids for augmented convective heat exchange, it may also be employed as an economizer with draft control functions when adapted to any heat source. FIG. 4 illustrates such a system in which the economizer is adapted to a conventional coal, wood, or refuse-fired heating system 39. Efficient combustion in all cases requires precise control of the combustion air which is supplied to the adapted burners, and this is particularly true of fuels such as wood and coal 40 which are supplied to the combustion chamber in a batch-wise fashion. The surface area of the fuel which is available for oxidation varies during the course of the firing, along with the natural draft and ash-pit or grate restrictions 41. When such a boiler is combined with the present invention, the gaseous combustion products are induced through the sealed and thermally insulated ducting 43 to the economizer component 10. A conventional barometric draft regulator 44 may be located at thr entrance to the economizer 10. After heat is recovered from these combustion products, they may be forcefully vented through the discharge port 45 and through the interconnecting duct 46 to the conventional flue system 49. Since the gases have undergone efficient heat transfer and their specific density is high, particularly when the condensible portion of the combustion products has been removed, the flow area of the interconnecting duct 46 may be relatively small. In the preferred arrangement, the inter-connecting duct 46 is attached to the side of the barometric damper 47 which is normally vented from heated quarters, and to flue duct 49 as shown in FIG. 4. In this arrangement as provided by this invention, (a) the combustion air 42 which is induced into the adapted boiler 39 is maintained constantly for a given adjustment of the counter-weighted damper 47. By-passed combustion products 48 are admitted on demand to satisfy the varying draft of the economizer fan 27 to maintain substantially constant over-fire draft conditions in the adapted boiler. (b) Since the draft is maintained in the barometric valving 44 by recirculated combustion products, heated air is not inspirated from living or heated quarters into the flue duct which provides a valuable thermodynamic advantage as well as safety advantage.

FIG. 4 further illustrates means for returning the sensible and latent heat energy derived from the combustion products in the form of heated water 50 to the inlet port 51 in the adapted boiler 39. Preheating or tempering of this inlet water reduces the corrosion problems in the adapted boiler. Water which is further heated by the boiler 39 may be pumped through conventional hydronic ducting 53 through any conventional hydronic heat load 54 and forcefully recirculated on demand by the circulating pump 55 through ducting 56 to the economizer unit 10. In lieu of an adapted boiler, the energy which is recovered from any heating process may be recirculated through water storage tanks, and the like, for energy storage or directly through hydronic circuitry in accordance with conventional practice.

Figure 5:
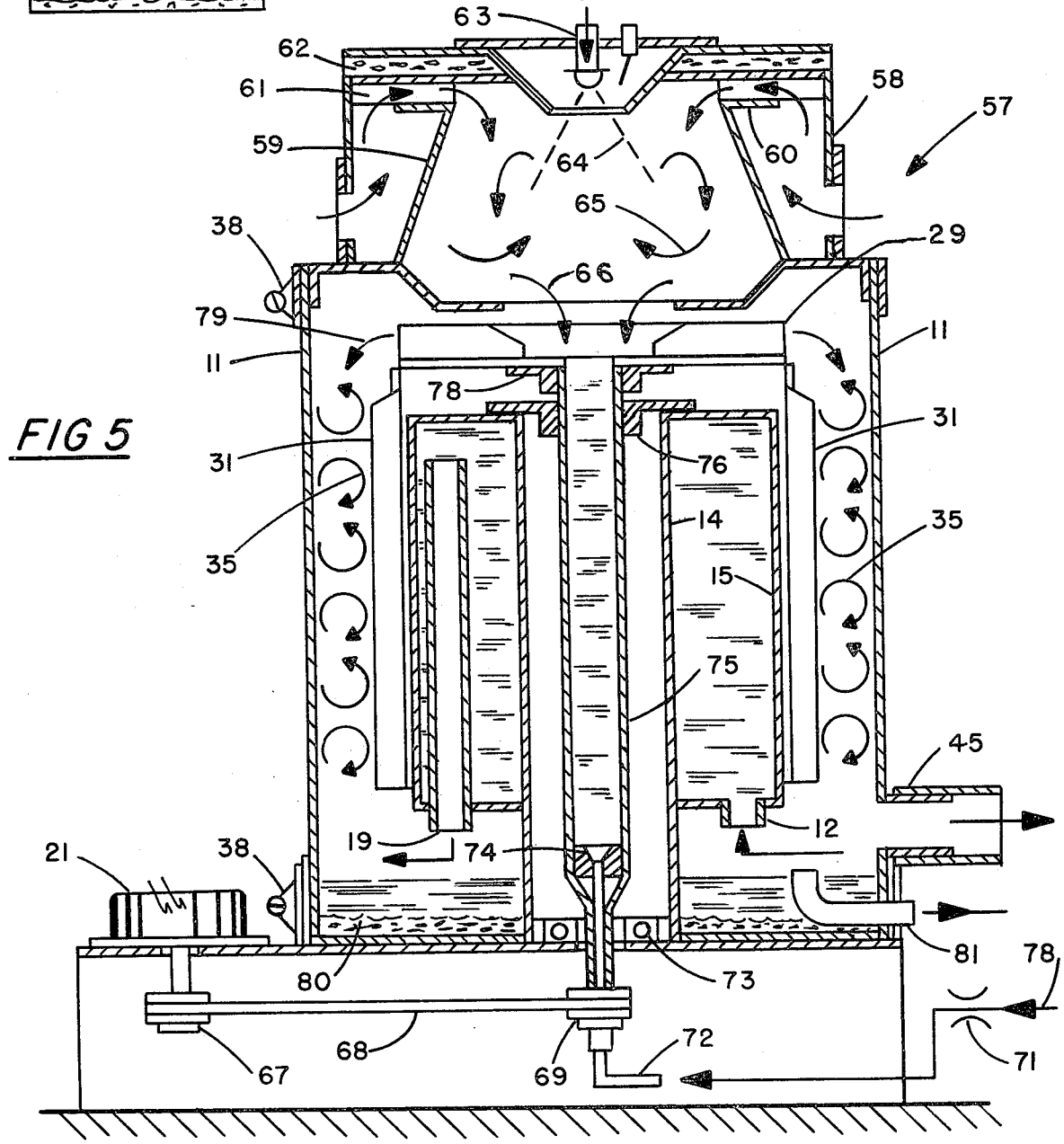
FIG. 5 is a side elevational view of an integrated burner and stirred heat exchanger providing direct contact heat exchange means between the combustion products and mechanically atomized water at the entrance to the stirred heat exchanger.

FIG. 5 illustrates direct adaptation of a burner module 57 to an externally stirred heat exchanger in a manner which exploits certain unique features of the stirred system for use with dirty fuels and many process applications.

In this case, the burner module 57 involves an outer shell 58 which is cylindrical and an inner shell 59 for the burner which is conical with the smaller diameter at the top where the fuel is admitted. Combustion air is induced through damper porting near the bottom end of the outer shell 58 and upwardly along the outer surface of the inner burner shell 59. A radial flange 60 is welded to the upper end of the inner burner shell 59, and this causes the induced combustion air to flow inwardly into the burner internal volume through swirl vanes 61 which space the radial flange 60 from the upper end of the burner outer shell 58. The induced combustion air which cools the outer surface of the burner shell 59 is admitted into the burner volume with an intense vortical motion. An insulating and sealing disc 62 is mounted on the top end of the burner outer shell 58, and a burner fuel metering, igniting, and flame-sensing control module 63 is mounted for down-firing on the top axis of the burner shell. An inner sheet metal cone preferably shrouds the accessory components which project into the burner volume, and the cone is preferably truncated with the minimum cross-section at the lower end. This arrangement (a) provides an orderly swirl pattern for the injected combustion air into the injected fuel for intimate mixing and intense combustion, and (b) allows stable ignition to occur in the sheltered zone surrounding the fuel injector.

The free-vortex pattern generated in the vicinity of the injected fuel and air 64 in combination with the divergent conical geometry of the combustion chamber intensifies an upward reverse flow pattern along the axis of the combustion volume with flame stabilization near the point of fuel injection 64. Combustion products are induced downwardly near the lower end of the burner 66 in a swirl sense which compliments the rotation and induction of the stirred heat exchanger fan 29.

In this application, the drive motor 21 is off-set from a tubular drive shaft 75 for the stirring mechanism. A drive pulley 67, conventional drive belt 68, and a conventional driven pulley 69 are used to power the lower end of the tubular drive shaft 75 which is supported near its lower end by a conventional bearing 73. Water from any source 78 is fed through a metering orifice 71, or the equivalent, into a capillary tube 72 which is stationary and fed through a drilled passage in the lower drive adapter for the tubular drive shaft. A rotary seal 24 is incorporated in the upper end of the drive adapter, and the water is supplied upwardly through the tubular drive shaft 75 to the face of the stirred heat exchanger fan 29. A self-aligning bearing bushing 76 centers the upper end of the tubular and water-cooled drive shaft 75. Combustion products at substantially their adiabatic flame temperature 66 are induced into the heat exchanger fan 29 along with the injected water 78 which is admitted at a controllable rate. Aside from water cooling of the fan 29, the injected water is finely atomized by the centrifugal action of the fan providing uniform and intense mixing of the atomized water and combustion products in the annular zone 79 surrounding the fan 29. A mixture of combustion products and superheated steam at a controllable temperature is made available for augmented convective heat transfer to the stirred heat exchanger 15.

Some of the unique features of an externally stirred heat exchanger system when employed with dirty fuels and process applications as illustrated in FIG. 5 may be summarized as follows:

(a) Ash or other particulate matter derived from the combustion process is centrifuged outwardly from the stirred heat exchanger surface 15 and scrubbed downwardly to a sediment chamber or the equivalent at the bottom of the heat exchanger, (b) In the case of coal-derived fuels producing abrasive slag or ash in their combustion products, special precautions with the externally stirred heat exchanger are unnecessary.

(c) In process heating applications where it is necessary to exactly regulate the temperature differential to the fluid being processed in order to avoid polymerization problems, and the like, water injection into the combustion products with vigorous mixing and temperature control at the heat exchanger inlet is an obvious advantage. The uniform heat transfer to the processed fluid, avoidance of "hot spots" in the processed fluid due to uncontrolled radiant heat transfer, and the recovery of the latent heat of the injected water are further advantages.

(d) Since the convective heat flux in the externally stirred system may be regulated by the relative velocity of the stirring mechanism, this provides a further experimental control means for process applications which are not available with conventional burner and convective heater combinations. The stirred heat exchanger system is not dependent upon a critical matching of the momentum energy in the combustion products for adequate heat transfer and the constraints of proper air-fuel flow for acceptable combustion.

(e) In view of the national energy shortage, many process industries must resort to inferior fuels requiring improved burner technology for acceptable combustion. Improved air-fuel mixing is mandatory with such fuels, and the present invention offers a unique advantage in this respect. Since a high convective heat transfer may be maintained in the externally stirred system with low pressure differential across the stirring component, a higher pressure differential may be generated across the burner component for a given accessory power input. This higher pressure differential across the burner module allows more vigorous internal mixing and volumetric firing rate which is a particular advantage with inferior fuels.

(f) It is well known in gas dynamic theory that the removal of heat from a high-temperature and high-velocity gas stream results in a stagnation pressure rise in the gas stream. (Ref.: Shapiro and Hawthorne, Gas Dynamic Theory, Vol. 2). In the present invention which involves evaporative cooling in the high-velocity and high-temperature gas stream exiting from the heat exchanger fan 29, conditions are optimized on the basis of classical gas dynamic theory for minimizing the accessory power requirement of the system.

FIG. 6 shows the use of a conventional water storage tank, or the equivalent, as a high-performance convective unit heater in accordance with the present invention. In this case, a relatively large radial bladed fan 82 which is mounted on a pivot bearing 84 and driven by a resilient drive means 25, as previously described, induces an upward flow of ambient air. The outer shell 11 generates outlet porting for the heated air 85. The upper end of the outer shell has a cover disc 83 for the fan 82. In this embodiment, the outer shell 11 has an annular wall 86 which confines heat and sound insulating material within the annular volume 87. An annular baffle 36 is welded to the lower end of an extended portion of the internal heat exchanger shell 14. The baffle 36 is fixedly attached to the upper face 88 of a lower support structure which also houses the drive motor 21. A circumferential band 90 which is supported by radial gussets 89 welded to the motor housing provides a lower mounting means for the outer heat exchamger shell 11. In this application, the stirring elements 91 may involve angular sheet metal strips as shown in FIG. 7 and FIG. 8. The strips are formed to generate a hydrodynamic bearing film against a fixed heat exchanger surface as discussed elsewhere.

This heat exchanger configuration may be used for heating and cooling applications with circulated air. The stirring energy allows relatively efficient operation when the temperature change between the air and heat exchanger surface is low. The circulating air fan is relatively quiet and efficient since it has no cut-off serodynamic noises or diffuser losses. When condensing steam is used within the heat exchanger tank, the stirring mechanism provides abnormally intense convective heat transfer with a cost effectiveness which is unmatched with conventional extended surface systems.

FIG. 9 shows the adaptation of an externally stirred heat exchanger unit as an economizer to a gas-fired appliance, such as a water heater 92. In this application, the lower structure 93 of the water heater 92 may generate a sealed volume for the gas burner 96. Gaseous fuel may be supplied to the burner 96 from a feed line 94 in the conventional manner through an electronic solenoid valve 95 and into a conventional atmospheric gas burner 96. Primary combustion air 97 is induced into the burner 96 as primary air by the aspirating action of the gaseous fuel, and secondary combustion air 98 is induced into the combustion zone by by the regulated draft to complete the combustion process. Since the economizer incorporates a draft inducing fan 27, a sub-atmospheric pressure level may be maintained in the combustion chamber which is preferably sealed 93 and which permits the combustion air to be induced from a remote source through an interconnecting duct 99. The remote air source is preferably external to the home or heated quarters and at a point where the ambient pressure level is equal to the pressure level at the flue discharge. The combustion products are induced from the combustion zone through the water heater center flue-type heat exchanger 100 in the conventional manner. Since the adapted economizer avoids dependence on natural draft, the water heater may be modified as desired with a higher pressure differential across its heat exchanger when used in combination with the present invention.

After completing partial heat exchange within the adapted water heater 100, the combustion products are induced into a conventional barometric valve 44 which is mounted directly above the water tank 92. In this case, the drive motor 21 for the externally stirring of the heat exchanger is mounted on the top of a compact unit with a short drive shaft 75 with a conventional coupling and bearing means 102 through an inner tubular shell 14 of the heat exchanger unit. The heat exchanger fan 27 and support baffle have vertically oriented stirring elements 31 as discussed in connection with FIG. 1. The combustion products are vigorously stirred relative to the external surface of the heat exchanger 15 with a relatively long physical residence time and with an orderly recirculation mechanism in accordance with the Taylor Principle. Water is preferably delivered from the street as potable water or from the lowest temperature point of an adapted hydronic circuit to the heat exchanger inlet 104. After recovering energy from the combustion products, the heated water 105 is preferably delivered to the inlet for the adapted water heater 106 and then outwardly through outlet 107. Whenever the water heater is energized, it is presumed that make-up water is supplied to the system or water is recirculated through the system in the conventional manner by external transfer pumps, or the like. Condensate which is generated from the combustion products 81 may be continuously drained from the system, and the effectiveness of the external stirring mechanism is not impaired by condensate filming on the stirred heat exchanger surface.

Combustion products from the stirred heat exchanger annulus are ported 45 to a flue duct which is inclined downwardly and with an interconnecting section to the valved leg of the barometric unit 44. Adjustment of the counter-weighted valve 47 in the conventional manner maintains the over-fire pressure level in the combustion chamber and the flow rate of induced combustion air 99 from an external source in the preferred manner. The barometric adjustment means 47 in combination with this invention allows operation with an unsealed atmospheric gas burner with controlled air induction from surrounding quarters, if this is elected. It must be recognized, however, that the balanced flue and combustion air induction means offered by this invention provide several thermodynamic and safety advantages. When this system is de-energized, it may be noted that there is no convective loss from the adapted heating or gas-fired water heater. The barometric damper 47 is automatically gravitated to its closed position, and there is no means available for natural convection of heat from the de-energized system to the external flue ducting. The conventional sail switch 103 may be used to prove the establishment of a draft in the exhaust ducting by action of the economizer fan 27 as a safety interlock with the conventional solenoid valve 95 in the fuel line during the starting cycle, and as otherwise desired.

FIG. 10 illustrates the use of the economizer unit of FIG. 9 in an inverted position. In this case, the flue ducting is also modified to avoid convective loss from the adapted heating system following shut-down. The inverted position of the economizer unit provides a heat trap in the flue ducting, and the barometric valving 47 is also gravitated to the closed position following shut-down.

It may be noted that all of the configurations which have been illustrated for draft control with a barometric valve in connection with the present invention, as in FIGS. 4, 9, and 10, involve maintenance of draft conditions with the barometric valve 44 in the combustion product stream at the inlet to the stirred heat exchangers before the occurrence of combustion product condensation. In this arrangement, the barometric valving is operating with gases of low specific density and within their conventional and accepted regime of operation. Although it is possible to maintain draft control through the installation of barometric valving downstream from the economizer units, this is relatively difficult when the condensation of combustion products occurs within the economizers. The present invention avoids this difficulty.

In many combustion actuated heating systems, it is desirable to modulate the combustion air flow to the heating systems to properly accomodate a wide range of firing rates. FIG. 11 illustrates an externally stirred economizer unit and conventional accessory components which may accomplish this function in accordance with the present invention. In this case, the economizer unit of FIGS. 9 and 10 is modified with an accessory support plate 109 which is welded to the end of an extension for the heat exchanger inner shell 14. The drive motor 21 is arranged as a countershaft drive with the drive pulley 69, drive belt 68, and driven pulley 67. The support bearing 73 is modified for side thrust due to the countershaft drive. The single drive belt 68, as shown in FIG. 12, accomodates two additional driven pullies, including pulley 111 and pulley 110. In FIG. 13, the driven pulley 111 energizes a water circulating pump 55 and the driven pulley 110 energizes a volumetric metering valve 112 for the combustion air which is induced into the adapted heating system.

FIG. 15 and FIG. 16 illustrate in detail a volumetric metering valve 112 which is acceptable for this purpose. An axial drive shaft 118 which is attached to the pulley 110 drives a single rotary component 119 which has radial blading generating segmental pockets within the rotary component 119. This component 119 is in sealing relationship with respect to a cylindrical housing 122 and end discs 120. The end discs incorporate central bearing bushings 121. An outer cylindrical shell 123 may clamp the end discs 120 and cylindrical housing together in a functional relationship and provide integral inlet 124 and outlet 125 porting which communicates with the segmental pockets generated by the rotary component 119. When a pressure differential is generated by an external means across the inlet 124 and the outlet 125 porting, a flow rate is maintained which is determined by the cross-sectional area generated by the rotating segment and the rotative speed of the segment. (Ref.: W. F. Coxon, "Flow Measurement and Control", Haywood & Co. Press., 1959. As discussed by this writer, this is a fan-type volumetric meter which has been used extensively for liquids and gases. In these applications, the speed of rotation is proportional to the velocity of fluid flow through the available flow area, and the energy for meter rotation is derived from the fluid stream. In an application involving the present invention, the volumetric flow rate is determined by the rotational speed at which the metering element is driven by the economizer unit drive motor.)

FIG. 14 shows diagrammatically the adaptation of an externally stirred economizer component to a conventional oil-fired boiler with volumetric metering of the induced combustion air flow. In this case, the capacity of the fan within the economizer component 108 is not critical, and the pressure differential across the adapted boiler and flue ducting 43, 117, is also not critical. The fan capacity may be large relative to the volumetric flow which is actually metered into the economizer 108. Under these conditions, a sub-atmospheric pressure level is assured in the combustion chamber of the adapted boiler. Combustion air is preferably induced from a source external to the heated quarters through ducting 115, through the volumetric metering component 112, and through interconnecting ducting 116 to the adapted boiler. The rate of combustion air flow may be optimized by adjusting the rotative speed of the meter 112 drive means or by the internal flow area of the driven meter. Since a single drive motor 21 may energize a positively displaced fuel metering unit 113, liquid circulating pump 55, externally stirred economizer unit 108, and combustion air metering unit at proportionate rotative speeds, the rotative speeds of the system accessories may be optimized for a given firing rate and these optimum proportionate speeds will be maintained for other drive motor 21 speeds and firing rates. In this arrangement, the rotative speed of the drive motor 21 may be responsive to the thermostatic demands of the heating system with conventional control circuitry, and the heating system parameters may remain optimized over a wide range of firing rates. Following shut-down of the heating system, the combustion air metering unit 112 is de-energized and no differential pressure is generated across the heatsystem by the economizer unit 108. Since the metering valving, combustion air ducting, heating system, flue ducting, and economizer are sealed from heated quarters, losses into the flue ducting from heated quarters are completely obviated. The need for stack dampers or other obstructions in the flue ducting are also obviated.

FIG. 17 and FIG. 18 show an embodiment of the present invention in which the external stirring mechanism for the heat exchanger is used to motivate ambient air, or other fluid, inwardly and outwardly with heat transfer augmentation over the entire length of the stirred heat exchanger. This embodiment is useful when the need for counter-current heat exchange is of secondary importance and where massive flow rate of the ambient fluid may be desired. In this case, the drive motor 21 may be situated at the top of the heat exchanger unit 15, and the inner shell of the stirred heat exchanger may be eliminated. A pivot stud 126 is preferably centered on the top of the stirred heat exchanger 15, and the upper support for the stirring mechanism 30 is mounted for rotation on this pivot stud 126. The drive motor 21 is preferably resiliently tethered 23 to an outer sheet metal housing 128. An upper cover plate 129 provides access to the motor drive 21, 23 and structural support for the sheet metal housing 128. Additional support for the housing 128 may be provided by an integral lower sheet metal baffle 127A. This baffle 127A in combination with the lower support baffle 126 provides anchoring and support means for radial struts 127 and a free in-and-out flow path for ambient air which is recirculated by the stirring elements 31.

During operation, the rotating stirring elements generate an unstable boundary layer at the stirred heat exchanger surface. Fluid which is propagated outwardly by the stirring elements is obstructed by the radial struts 127 so that a pressure differential is generated on the opposite faces of the radial struts 127. Fluid which impinges on the struts in the direction of the stirring element rotation is deflected outwardly, and this mass defect at the stirred boundary layer must be satisfied by the radial inflow of ambient fluid along the downstream radial face of the struts 127.

Figure 19:
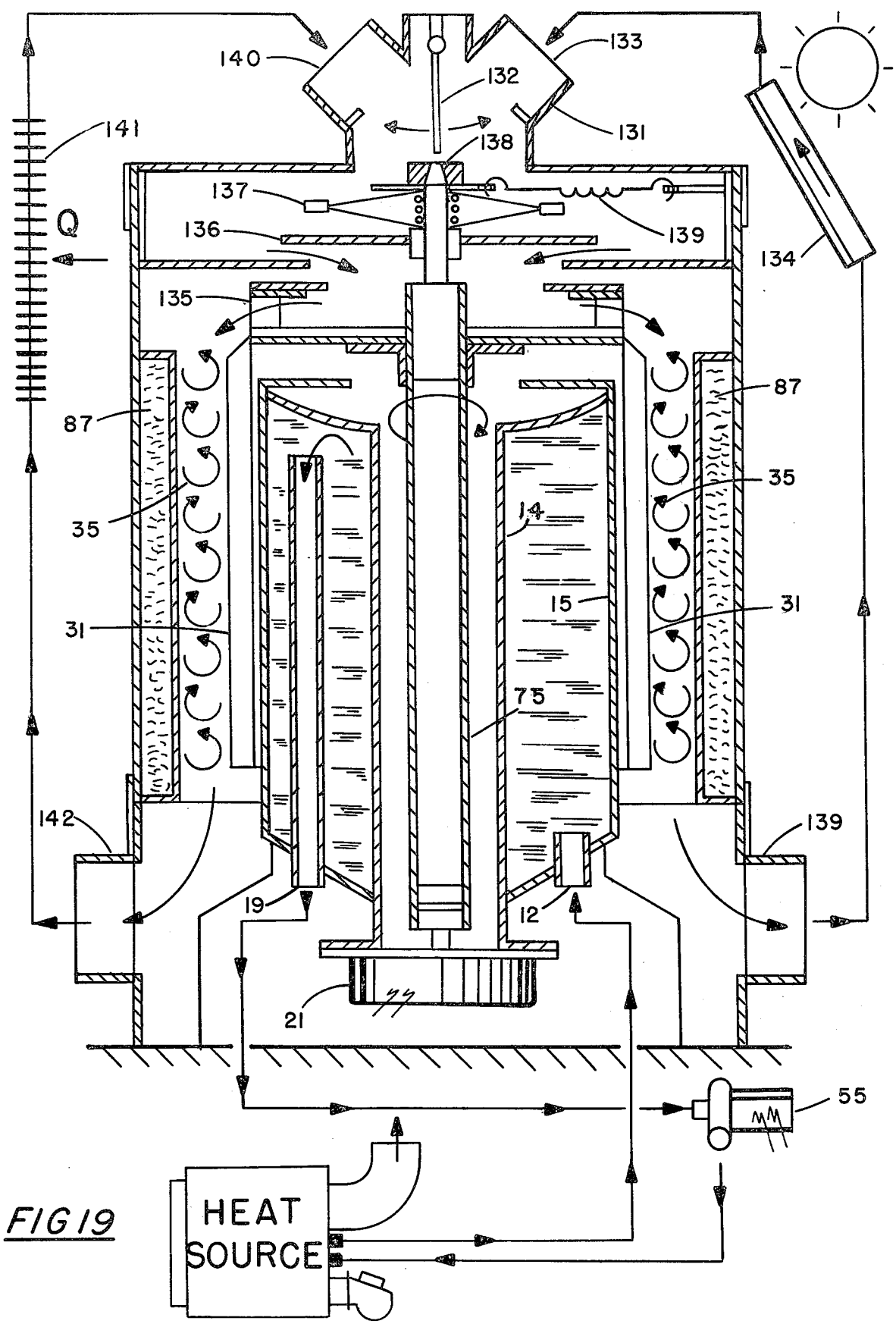
FIG. 19 is a side elevational view of a conventional water storage tank when arranged in accordance with the present invention to function as an energy storage means for recirculated solar heated air and/or an energy source for heating air recirculated through living quarters for comfort heating.

FIG. 19 generally illustrates the use of the present invention for externally stirring water storage tanks, or the like, for space heating purposes with heat derived from the storage tanks. It also illustrates means for conserving energy from solar heated air in the storage tank or immediately recirculating any portion of this energy in the solar heated air to other quarters for space heating. It further illustrates means for eliminating thermal losses due to natural convection from the storage tank when the system is de-energized. It fully anticipates back-up heating means for the solar energy, and rate scheduling to the consuming public by public utilities or utilization of other intermittent or cyclic heat sources. It fully exploits the water storage tank as the most cost effective heat exchanger means which may be available to the consuming public.

In the embodiment of FIG. 19, a sheet metal Y-connection 131 is mounted at the top of a stirred heat exchanger assembly. Within this Y-connection 131 is a damper plate 132 which is pivoted at the top and arranged for externally controlled setting at any intermediate position or extreme angular positions which may fully block the inlet path for induced air which has been solar heated 133 through the solar collector 134 or fully block the inlet path 140 for air which has been returned through a heating load 141 in living quarters, or the like. During operation, the drive motor 21 provides a lower support bearing and drive means for a central drive shaft projecting upwardly through the central duct which is normally present in center-flue water heater tanks. A pivot bearing 138 is mounted at the upper end of the drive shaft, and this pivot bearing 138 is resiliently tethered 139 as described elsewhere. On an adapter section near the upper end of the drive shaft is mounted a damper disc 136 which rotates with the drive shaft and is freely slideable up-and-down on the adpater section of the drive shaft. A conventional fly-weight mechanism 137 is arranged to centrifuge outwardly during rotation of the drive shaft. Since the upper end of the mechanism is fixedly attached to the adapter section, the centrifugal force of the fly-weights compress a spring mounted on the axis of the adapter section and elevate the damper disc 136 to an open position. When the system is de-energized, the damper disc 136 returns by urging of the spring to positively seal a central orifice at the inlet for the circulating air blower 135.

During operation, solar heated air 133 may be fully induced when the damper 132 fully blocks the inlet duct 140 for recirculating air from heated quarters. In this case, the vigorous stirring of the solar heated air relative to the heat exchanger surface 15 augments the heat flux to the storage tank. Since energy within the tank tends to stratify with internal natural convection to the upper internal volume of the tank, the solar heated air flows generally counter-currently with respect to this heat exchanger when in a down-flowing mode. A common plenum volume may be used at the lower end of the heat exchanger for ducting to the solar heater 139 and ducting to quarters for space heating 142. When the damper 132 is in the aforementioned extreme position, the air mass induced from the solar collector 134 must be satisfied by an equivalent flow through the lower ducting 139 without additional damper action. Likewise, when the control damper 132 completely blocks the induction of solar heated air 133, the full blower capacity 135 is applied to recirculation of air from living quarters and energy is withdrawn from the stirred tank for heating purposes. An intermediate position of the damper 132 provides correspondingly intermediate flow of solar heat air for energy storage or for space heating purposes. Liquid in the storage tank may be recirculated 55 in the conventional manner to remote or directly connected auxiliary heating systems.

Figures 20, 21:
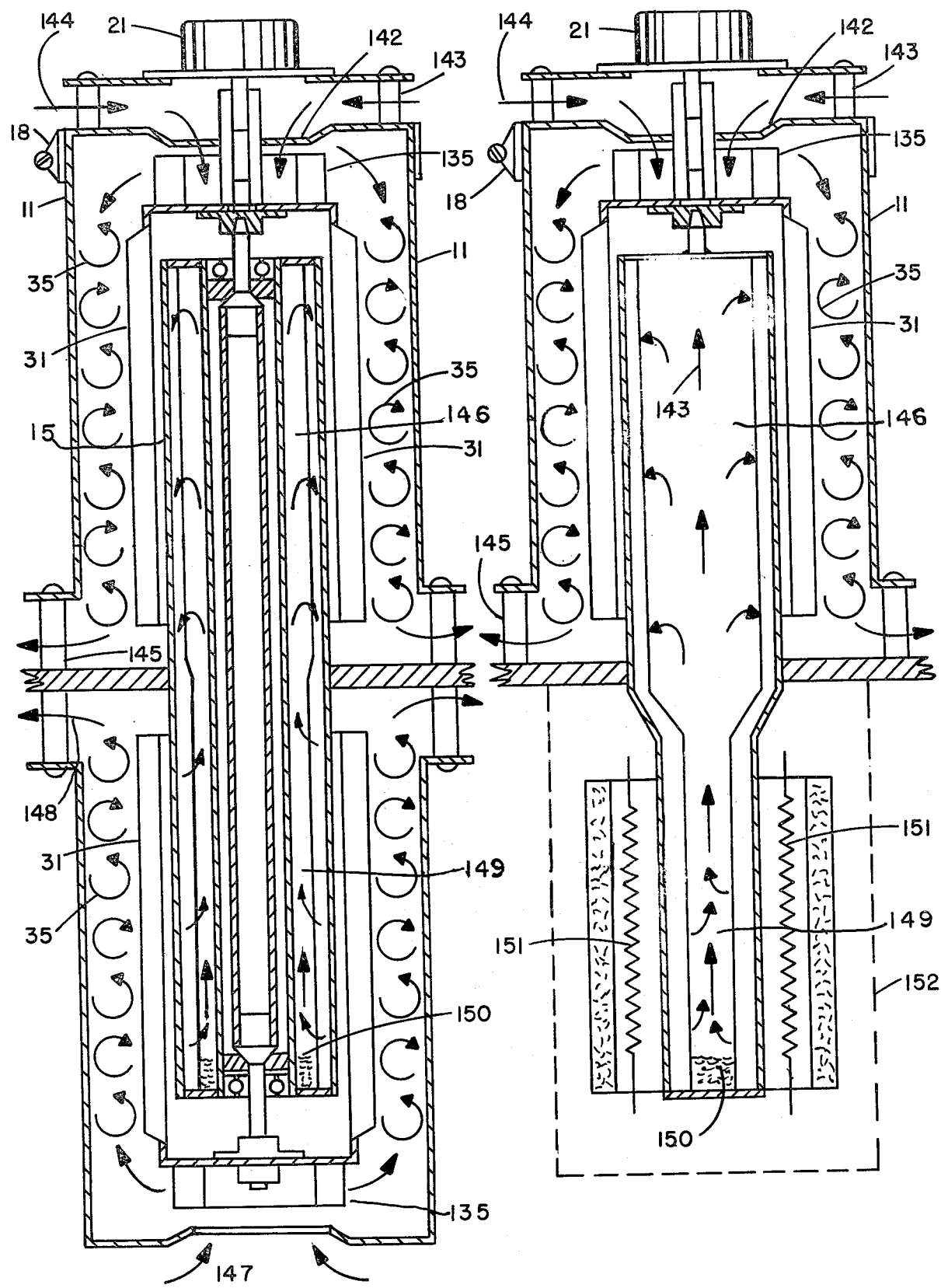
FIG. 20 is a side elevational view of a heat pipe or reflux boiler incorporating the present invention and providing augmented heat flux with the evaporating and condensing portions of the heat pipe through external mechanical stirring.
FIG. 21 is a side elevational view of a heat pipe or reflux boiler incorporating the present invention in which the evaporating portion of the heat pipe is in conductive relationship with the heat source, as in electronic and computerized equipment requiring a reliable and controllable heat sink.

In FIG. 20, the condensing and evaporating portions of a heat pipe or reflux boiler are externally stirred in accordance with the present invention. In this case, a single drive motor 21 may be used to externally stir the opposite ends of an extended outer cylinder with a closed internal annular volume. A central drive shaft may project through a co-axial tubular section of the closed annular boiler. In this case, air from any source 14 is induced through the support struts 143 for the drive motor 21 and then through and inlet orifice 142 leading into a circulating air blower 135 which is of conventional Sirocco-type construction. This air is driven through the annulus generated between the outer shell 11 of the heat exchanger and the outer surface 15 of the stirred heat exchanger. A stirring mechanism as previously described 31 in connection with FIG. 1 augments convective heat transfer from the stirred surface in this upper end or condensing portion of the heat pipe to the circulating air flow with internal recirculation within the stirred annulus in accordance with the Taylor Principle. The heated air 145 is forcefully vented near the center of the heat pipe and above a separating partition from the lower stirred section. Likewise, a hot gas 147 may be induced at the lower end or evaporative portion of the heat pipe by the action of the lower blower element. This hot gas stream is vigorously stirred about the lower portion of the heat exchanger in its upward travel with forceful venting 148 below the partition separating the heat pipe condensing and evaporating sections. The hermetic annular reflux boiler or heat pipe preferably incorporates an inner wick which lines the inner surface of the evaporator portion 149 and the condenser portion 146. In the preferred vertical orientation, the condensed working fluid within the heat pipe or reflux boiler is continuously refluxed and collected at the lower internal end of the evaporator. Since the conditions within the reflux boiler are substantially isothermal over an extended length of the heat exchanger, the present invention provides means for exchanging energy efficiently, particularly from hot and dirty waste gases, to a remote ambient air stream with high overall convective heat transfer coefficients. It is obviously not essential that a single drive motor be used for stirring of the condensing and evaporating portions. Likewise, it is not essential that the reflux boiler or heat pipe retain a simple cylindrical configuration to practice this invention.

FIG. 21 shows a modification of a stirred heat pipe or reflux boiler which utilizes conductive heat transfer from the heat source in its operation. This is particularly adaptable to computerized equipment having localized heat sources with critical temperature control requirements. In this case, the electronic heat source 151 may be externally insulated with internal conductive path to the evaporative portion 149 of the heat pipe to maintain the temperature under control within the prescribed space 152. In applications where a liquid heat sink is used for the condensing portion through special design constraints, mechanical stirring of a hot fluid source solely around the evaporator portion is also anticipated.

Since the convective heat transfer coefficient of an externally stirred heat exchanger increases linearly with the velocity of the stirring mechanism relative to the stirred surface when this film-side is limiting, a feature of the present invention involves means for providing simple and dynamically stable stirring mechanisms when operating at high velocities relative to an internal heat exchanger surface. A stirring mechanism has been shown in FIGS. 1, 2, 6, and 7 which involves angular sheet metal strips which are mounted longitudinally on the stirring mechanism for rotation about the heat exchanger surface. The geometry of the angular strips assures that a hydrodynamic film is generated from the stirred fluid for bearing and stabilization purposes against the stirred heat exchanger surface. Since the stirring elements are subjected to centrifugal force which tends to sling them away from the stirred surface, a design objective must involve the maintenance of uniform radial loading and "anti-whip" features. This is achieved in this configuration with the equally distributed longitudinal strips with self-generating hydrodynamic loading and the circumferential constraint of one or more resilient foil bands.

Another method for supporting the external stirring mechanism is shown in FIGS. 22, 23 and 24. In this case, flat sheet metal strips 153 are equally spaced and spot welded to the upper support disc 30 and to the lower circumferential foil bearing elements 154. These foil bearing elements 154 may involve a minimum of three overlapping sections 155. As shown in detail in FIG. 24, these overlapping sections generate a fluid opening at the leading edge in the rotation sense, and the continuing overlapped section preferably generates an arcuate outer shape 157 in the section which is overlapped. During rotation, this foil bearing arrangement provides localized radial loading at the overlapped section due to (a) the stagnation pressure from the fluid which is entrapped beneath the foil 156 and (b) hydrodynamic lift on the outer foil arcuate surface 157. When air or gases are involved in the stirred heat exchanger, this foil bearing arrangement provides an air or gas film support for the stirring mechanism with low bearing torque requirements. It may also be noted that the effectiveness of the air or gas-film bearing is superior at high temperature levels, since the viscosity of air and gases increases approximately as the square root of the rise in their absolute temperature level.

Another method for supporting external stirring mechanism with bearing films generated from the fluid undergoing heat transfer is shown in FIGS. 25 and 26. In this case, the the stirred heat exchanger surface may incorporate longitudinal corrugations or strips 160 in equal circumferential spacing about the cylindrical heat exchanger surface 159. The strips 160 are preferably integral with the heat exchanger surface or in heat conductive relationship with the surface. Rotation of a resilient foil bearing 161 about this modified heat exchanger surface generates localized radial loading points 162 for stabilizing the foil bearing relative to the stirred surface. This method may be used with large tanks which are commercially available with longitudinal weld beads or other surface irregularities.

FIGS. 27 and 28 illustrate these foil bearing arrangements when viewed in the cross-sectional plane of typical stirred heat exchangers.

In FIG. 29, an externally stirred heat exchanger 15 is used in a refrigeration or heat pump application which uses water, or other liquid, as an energy source. In this case, an hermetic motor 164 is submerged in the circulating water. The motor is resiliently supported 23 for rotation of the water stirring element on a central pivot stud 126 on the top of the heat exchanger. The motor is preferably mounted in a chamber generated by an extension of the outer sheet metal shell 11 of the heat exchanger. An internal cylinder within the shell has an integral lower baffle 165 which generates an inlet orifice for water recirculated by the pump element 168 which is mounted on the top of the stirring element support disc 30. An upper sealing disc with an internal cylindrical flange 166 is sealed and clamped in place by clamping ring 167 which also provides a water inlet connection 169 which communicates with porting through the extended housing 11 to the motor section. After the circulating and stirred water has undergone heat exchange, it is discharged through a port 170 at the lower end of the heat exchanger outer housing 11.

In the condensing mode of operation, the refrigerant vapor from a conventional compressor 181, as shown diagrammatically in FIG. 30, is admitted through port 180 which is in a lower extension of the stirred heat exchanger. The refrigerant vapor distributes uniformly with negligible pressure drop over the inner surface of the stirred heat exchanger 177. Following condensation, the liquid refrigerant is gravitated to the lower end of the stirred heat exchanger 171 and returned to an external refrigerant receiver 182 of conventional construction. In this mode, the relatively high flux which is available from the condensing refrigerant is recovered in the vigorously stirred circulating water on the opposite side of the heat exchanger surface with a simple smooth-surface heat exchanger structure and relatively low fluid pressure drop.

In the evaporating mode of operation, the liquid refrigerant is delivered with high-side pressure to a conventional receiver 182, through a conventional expansion valve 183, and then upwardly through a central delivery tube 174 to a spouting orifice 175 near the top of the stirred heat exchanger volume. A second tube 176 is preferably co-axial with the delivery tube 174 and has an annular opening at its bottom within the liquid refrigerant 171 which may have returned to this point by gravity within the stirred heat exchanger volume. The spouting action of the injected refrigerant 175 aspirates through jet-pumping or momentum exchange means the non-evaporated liquid refrigerant 171 for further recirculation over the evaporating surface 178. A deflecting baffle 177 assures that the liquid refrigerant is delivered to an annular wick 178, or the equivalent, at the top of the stirred heat exchanger volume. Vapor which is generated at the inner surface of the stirred heat exchanger is delivered outwardly from the port 180 which is near the lower end of the heat exchanger. In this arrangement, a portion of the high fluid pressure drop which occurs across conventional expansion valves 183 in the refrigeration and heat pump systems is used advantageously for internal atomization and recirculating of the fluid refrigerant during the evaporating mode of operation. The low pressure drops which are involved otherwise in the condensing and evaporating modes of heat exchange with this stirred system allow a substantial reduction in compressor high-side pressure for a given rating of the system and a higher coefficient of performance.

In all embodiments of the present invention, external power is used to rotate a pervious stirring mechanism in a fluid boundary layer surrounding a heat exchanger surface. Professor Taylor has defined the conditions in which the present invention establishes an unstable boundary layer at the heat exchanger surface and provides heat transfer augmentation at the surface with vortex-dominant flow in the surrounding fluid. (See, for example, "Fluid Friction Between Rotating Cylinders", Sir Geoffrey I. Taylor, Proceedings of The Royal Society of London, Series A, Vol. 157, Pg. 56 et sequi, 1936).

The "Taylor Number" Criterion, $N_{Ta}$, for heat exchangers in accordance with the present invention has been defined as $$N_{Ta} = \left(\frac{\rho \omega R b}{\mu}\right)\left(\frac{b}{R}\right)^{\frac{1}{2}}$$

where
$\rho$—Fluid density, lb/ft$^3$
$\mu$—Fluid viscosity, lb/sec-ft
b—Radial gap between stirring element and inner shell of heat exchanger, ft
R—Radius of stirring mechanism, ft
$\omega$—Rotational velocity, radians/sec, or $2\pi n/60$
n—Revolutions/min, rpm When, for example, air under standard conditions is stirred around a cylinder having a nominal 1 ft diameter and surrounding annular gap of 2 inches with stirring mechanism at 3600 Rev/min, we have $\rho \cong 0.075$ lb/ft$^3$ $\mu \cong 1.22 \times 10^{-5}$ lb/sec-ft $b \cong 0.167$ ft $R \cong 0.5$ ft $\omega \cong \frac{2\pi\, 3600}{60} = 377$ radians/sec and $\frac{\rho \omega R b}{\mu} \cong \frac{0.075 \times 377 \times 0.5 \times 0.167}{1.22 \times 10^{-5}} = 194{,}000$ $\frac{b}{R} \cong \frac{0.167}{0.5} \cong .334$ giving $N_{Ta} \cong 11 \times 10^4$ for this example The Taylor Number determined in this way for all embodiments of the invention assures that the boundary layer of the stirred heat exchangers are conservatively within the "vortex-flow" or "turbulent" regime of operation with a potential for abnormally high convective heat transfer.

For comparison, an air velocity of approximately 10 ft/sec is commonly used for fan-blown conventional heat exchangers. In the above example, the relative air velocity of the stirred heat exchanger is $(1 \times 3600 \times \pi)/60$ or 188 ft/sec suggesting that 188/10 is an order of magnitude for the convective heat transfer improvement per unit area for the present invention. When the fan-blown conventional unit is exchanging heat with fluids undergoing phase change on the opposite side of its heat exchanger surface, this estimate is ultra-conservative since the fin effectiveness of fan-blown extended surfaces may be less than 20%.

What is claimed is:

1. A process for improving convective heat exchange between a generally cylindrical exchanger and surrounding fluid the steps of
   a. mounting a pervious cylindrical stirring mechanism with a single end support baffle and central rotary drive means for rotation in the fluid boundary layer surrounding said generally cylindrical exchanger,
   b. rotating said pervious stirring mechanism with external power delivered through said central rotary device means and single support baffle,
   c. generating hydrodynamic bearing support for a portion of said pervious cylindrical stirring mechanism relative to said generally cylindrical exchanger through rotation in said fluid boundary layer,
   d. maintaining a rotary stirring velocity in said fluid boundary layer,
   whereby instability generated within said fluid boundary layer assures improved convective heat exchange with said generally cylindrical exchanger and convective vorticity exchange with surrounding fluid in accordance with Taylor Vorticity Transport Principle.

2. A process for improving convective heat exchange between a generally cylindrical exchanger and surrounding fluid as is claimed in claim 1, in which
   rotation of said pervious cylindrical stirring mechanism with external power also rotates a fluid pumping element integral with said single end support baffle with continuous pumping of fluid for heat exchange through an annular flow area surrounding said rotating pervious cylindrical stirring mechanism.

3. A process for improving convective heat exchange between a surrounding fluid and a generally cylindrical exchanger as claimed in claim 2 in which
   an end of said generally cylindrical exchanger provides a central bearing support means for the rotation of said pervious cylindrical stirring mechanism.

4. A process for improving convective heat exchange between a generally cylindrical exchanger and surrounding fluid as claimed in claim 3 in which
   said generally cylindrical exchanger generates an internal volume providing heat exchange at its inner generally cylindrical surface with a second fluid stream which is continuously delivered through said internal volume with external mechanical pumping means for said second fluid stream.

5. A process for improving convective heat exchange between a generally cylindrical exchanger and surrounding fluid as claimed in claim 4 in which maintaining a rotary stirring velocity in said fluid boundary layer centrifuges outwardly away from said generally cylindrical exchanger dirt and condensing portions of fluid undergoing heat transfer in gaseous streams.

6. A process for controlling the temperature differential and improving the convective heat exchange between a surrounding gaseous stream and cylindrical heat exchanger the steps of a. mounting a cylindrical heat exchanger vertically with a closed annular internal volume for process fluid undergoing heat exchange, b. rotating a pumping element at the upper end of said cylindrical heat exchanger by a drive shaft extending downwardly through the axis of said closed annular volume to a rotary external power means, c. stirring fluid in the boundary layer surrounding said cylindrical heat exchanger with a cylindrical stirring mechanism attached at its upper end to said central drive shaft through a single end support baffle and said rotary pumping element, d. injecting water at a controllable rate into said pumping element, e. pumping hot gases and water mixture into an annular flow volume surrounding said cylindrical stirring mechanism, f. mixing the injected and centrifugally atomized water with hot gases to obtain an initial mixture temperature level for proper temperature differential with process fluids undergoing heat exchange, g. stirring the boundary layer fluid surrounding said cylindrical heat exchanger so that a portion of said cylindrical stirring mechanism is hydrodynamically supported relative to said cylindrical heat exchanger, h. exchanging sensible and latent heat energy from the gaseous mixture with said cylindrical heat exchanger and maintaining an unstable fluid boundary layer through mechanical stirring near said cylindrical heat exchanger with removal of dirt and condensate outwardly from the stirred cylindrical heat exchanger surface, i. removal of uncondensed gases from the said annular flow volume after they have undergone useful heat exchange along with condensate and dirt derived from the gaseous stream.

7. A process for controlling the temperature differential and improving the convective heat exchanger between a surrounding gaseous stream and a cylindrical heat exchanger as claimed in claim 6 in which the hot gases pumping into the stirred heat exchanger are derived from a burner module having induced combustion air flow with vigorous internal mixing and volumetric combustion by virtue of the pumping capacity and and flow stability of said heat exchange process.

8. A process for improving the performance of a cylindrical heat pipe and exchanging heat between two streams through use of the heat pipe, the steps of a. mounting a first pervious cylindrical stirring mechanism with a single end support baffle and central rotary drive means for rotation in the fluid boundary layer surrounding a condensing portion of said cylindrical heat pipe, b. rotating said first pervious cylindrical stirring mechanism and attached fluid pumping element with external power delivered through said central rotary drive means and single end support baffle, c. pumping a first fluid stream continuously through an annular flow housing surrounding the said rotating pervious cylindrical stirring mechanism and surrounding said condensing portion of said cylindrical heat pipe, d. Mounting a second pervious cylindrical stirring mechanism with a single end support baffle and central rotary drive means for rotation in the fluid boundary layer surrounding the evaporative portion of said cylindrical heat pipe, e. Rotating said second cylindrical and pervious stirring mechanism and attached fluid pumping element with external power delivered through said central rotary drive means and single end support baffle, f. Pumping a second hot fluid stream continuously through an annular flow housing surrounding said second rotating pervious cylindrical stirring mechanism surrounding the evaporative portion of said cylindrical heat pipe, g. Removing the first stream and the second stream separately after they have undergone useful heat exchange through use of the heat pipe, whereby the high thermal conductance of the heat pipe is used to exchange heat between said first and second streams with convective heat transfer augmentation due to the mechanical stirring action of the system.

9. In a process for improving the performance of a cylindrical heat pipe and exchanging heat between two streams through the use of the heat pipe as claimed in claim 8, the step of mounting the said cylindrical heat pipe and said perforate cylindrical stirring mechanisms vertically with the condensing portion near the top end, whereby refluxing of the internal fluid is augmented during the heat exchange process.

10. An economizer apparatus for useful recovery of sensible and latent heat energy from dirty combustion products comprising a generally cylindrical heat exchanger section which generates a sealed internal annular volume and open tubular volume along the axis of the tubular section, a central bearing support near an end of said generally cylindrical heat exchanger section, a pervious cylindrical stirring mechanism having an open internal diameter larger than the external diameter of said generally cylindrical heat exchanger section and attachment with a single end support baffle, central rotary drive means attached to said end support baffle and mounted for rotation in said central bearing support, said central rotary drive means connected through an extended drive shaft through said open tubular volume along the axis of the heat exchanger section to a drive motor mounted at the lower end of said heat exchanger section, a radial blower element co-axially mounted for rotation and gas induction on the upper face of said single end support baffle, an outer cylindrical housing generating an annular flow area in combination with the central said generally cylindrical heat exchanger and stirring mechanism, upper baffle means sealing the upper end of said cylindrical housing and ducting dirty combustion products to said upper radial blower, lower baffle means for sealing lower end of said cylindrical housing with venting means for combustion products which have undergone useful heat exchange, an inlet port at the lower end of said heat exchanger section communicating with the lower end of said sealed annular heat exchanger volume, an outlet port at the lower end of said heat exchanger section communicating with the upper end of said sealed annular heat exchanger volume.

11. An economizer apparatus for useful recovery of sensible and latent heat energy from dirty combustion products as claimed in claim 10
where said extended drive shaft is resilient and the weight of the drive motor at the end of said resilient shaft is tethered in central position beneath said generally cylindrical heat exchanger section by three tension springs connected to a lower extension of said outer housing.

12. An economizer apparatus for useful recovery of sensible and latent heat energy from dirty combustion products as claimed in claim 10 in which
said pervious cylindrical stirring mechanism comprises longitudinal arcuate sheet metal sections having extended flat sections at opposite ends, said extended flat sections equally distributed and attached for rotation at outer radius of said upper support baffle, the opposite ends of said extended flat sections equally distributed and attached to a lower flexible circumferential band,
whereby said longitudinal arcuate sections provide hydrodynamic support relative to said generally cylindrical heat exchanger during rotation and said lower flexible circumferential band constrains the said longitudinal sections from outward centrifugal movement relative to said cylindrical heat exchanger.

13. An economizer apparatus for useful recovery of sensible and latent heat energy from dirty combustion products as claimed in claim 12
in which said lower flexible circumferential band comprises overlapped band sections, said overlapped band sections equally distributed about the circumference of the band, said overlapped sections are spaced radially apart and generate fluid inlet openings at the leading edge of said overlapped sections in the sense of said band rotation, the continuation of said overlapped sections generate arcuate outer surfaces in the portions which overlap,
whereby rotation of said circumferential band with overlapped sections generate equally distributed hydrodynamic lift and stagnation loaded film support for stabilizing said stirring mechanism relative to said cylindrical heat exchanger.

14. An economizer apparatus for useful recovery of sensible and latent heat energy from dirty combustion products as claimed in claim 10 in which
said generally cylindrical heat exchanger comprises surface corrugations distributed longitudinally and equally circumferentially about said generally cylindrical heat exchanger surface,
whereby a resilient foil bearing rotated around said surface is subjected to a stable and equally distributed hydrodynamic loading during its rotation in a boundary layer fluid relative to said surface.

15. An economizer apparatus for useful recovery of sensible and latent heat energy from dirty combustion products as claimed in claim 10,
wherein said pervious cylindrical stirring mechanism supports a cylindrical wire cloth sheath for rotation around said generally cylindrical heat exchanger section.

16. A process for using a conventional center flue-type water storage tank as a cost-effective heat exchanger for space heating or solar energy storage, the steps of
a. mounting said center-flue storage tank in an inverted position relative to its normal operation,
b. providing an external cylindrical housing around the tank with an annular flow area generated between the tank and said cylindrical housing,
c. mounting an upper support baffle at the top of said storage tank on a central rotary drive shaft extending downwardly to a drive motor mounted at the lower end of said centerflue,
d. attaching a pervious cylindrical stirring mechanism to said upper support baffle for rotation in the fluid boundary layer film surrounding the said storage tank,
e. mounting an air blower centrally on the upper support baffle,
f. projecting an extension of said central drive shaft upwardly to a pivot bearing at its upper end with central resilient mounting means for said pivot bearing,
g. providing a centrifugally actuated air baffle which opens air porting to said air blower with rotation of said central drive shaft,
h. rotating said central drive shaft to admit air into said blower and stabilize a portion of said cylindrical stirring mechanism relative said cylindrical storage tank,
i. adjusting a single air damper to selectively induce and recirculate solar heated air for energy storage through convective exchange with said stirred storage tank or induce and recirculate air from quarters for heating through convective exchange with said storage tank,
j. providing optional back-up energy sources with conventional hydronic external circuitry to said storage tank
whereby energy losses from the storage tank through natural convection are avoided when the system is de-energized.

* * * * *